US012748674B2

(12) United States Patent
Khaitan et al.

(10) Patent No.: US 12,748,674 B2
(45) **Date of Patent: *Sep. 29, 2026**

(54) ACCURATE GLOBAL EVENTUAL COUNTING

(71) Applicant: NETFLIX, INC., Los Gatos, CA (US)

(72) Inventors: Varun Khaitan, San Francisco, CA (US); Joseph Lynch, Gaithersburg, MD (US); Rajiv Shringi, Fremont, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/006,020

(22) Filed: Dec. 30, 2024

(65) Prior Publication Data

US 2025/0208967 A1 Jun. 26, 2025

Related U.S. Application Data

(63) Continuation of application No. 17/683,818, filed on Mar. 1, 2022, now Pat. No. 12,181,995.

(51) Int. Cl.

| | |
|---|---|
| ***G06F 16/00*** | (2019.01) |
| ***G06F 9/54*** | (2006.01) |
| ***G06F 11/30*** | (2006.01) |
| ***G06F 40/284*** | (2020.01) |

(52) U.S. Cl.

CPC .......... *G06F 11/3075* (2013.01); *G06F 9/542* (2013.01); *G06F 11/3082* (2013.01); *G06F 11/3086* (2013.01); *G06F 40/284* (2020.01); *G06F 2201/835* (2013.01); *G06F 2201/88* (2013.01)

(58) Field of Classification Search

None

See application file for complete search history.

(56) References Cited

U.S. PATENT DOCUMENTS

| | | | | |
|---|---|---|---|---|
| 6,507,852 | B1 * | 1/2003 | Dempsey | G06F 16/2358 |
| 7,315,863 | B2 * | 1/2008 | Kambo | G06Q 10/06 707/999.102 |
| 7,519,797 | B1 * | 4/2009 | Stiehl | G06F 9/3867 712/225 |
| 7,529,979 | B2 * | 5/2009 | Dombrowa | G06F 11/3452 714/39 |
| 8,413,169 | B2 | 4/2013 | Grabs et al. | |
| 8,751,529 | B2 | 6/2014 | Zhang et al. | |
| 8,788,254 | B2 * | 7/2014 | Peloski | G06F 16/2393 707/706 |

(Continued)

FOREIGN PATENT DOCUMENTS

| | | | |
|---|---|---|---|
| CN | 115495424 A | 12/2022 | |
| CN | 116701091 A | 9/2023 | |
| EP | 2239664 B1 * | 11/2017 | G06F 11/3017 |

*Primary Examiner* — Jean M Corrielus

(74) *Attorney, Agent, or Firm* — Artegis Law Group, LLP

(57) ABSTRACT

In various embodiments, a computer-implemented method comprises receiving, from a first endpoint device, a first event during a first time period, modifying an event log to include a record associated with the first event, causing a rollup queue to include a request to count a first count value associated with the first event, and generating, in a second time period subsequent to the first time period, a counter value associated with at least the first event based on the rollup queue and the event log.

20 Claims, 12 Drawing Sheets

(56) References Cited

U.S. PATENT DOCUMENTS

| | | | |
|---|---|---|---|
| 8,855,970 | B2 * | 10/2014 | Sethumadhavan .......................... G06F 11/3409 702/186 |
| 8,904,063 | B1 * | 12/2014 | Sandstrom .............. G06F 9/542 710/39 |
| 8,924,692 | B2 * | 12/2014 | Knauth ................... G06F 9/466 712/220 |
| 9,329,972 | B2 * | 5/2016 | Halverson ............... G06F 21/55 |
| 9,647,905 | B1 * | 5/2017 | Pittman ............... G06F 11/3006 |
| 9,983,968 | B2 * | 5/2018 | Gwozdz ............. G06F 11/3409 |
| 10,324,817 | B2 * | 6/2019 | Norrie ................... G06F 11/302 |
| 10,740,211 | B2 * | 8/2020 | Brown ................ G06F 11/3082 |
| 10,776,196 | B2 * | 9/2020 | Ohana ................. G06F 11/0709 |
| 10,810,103 | B2 * | 10/2020 | Lin ....................... G06F 16/258 |
| 11,016,824 | B1 | 5/2021 | Wells et al. |
| 11,061,569 | B2 | 7/2021 | Hallak et al. |
| 11,182,478 | B2 | 11/2021 | Viscuso et al. |
| 11,288,161 | B2 | 3/2022 | Togawa |
| 11,645,114 | B2 | 5/2023 | Oliveirinha et al. |
| 11,775,495 | B2 | 10/2023 | Kavanagh et al. |
| 12,181,995 | B2 * | 12/2024 | Khaitan .............. G06F 11/3082 |
| 2002/0174083 | A1 * | 11/2002 | Hellerstein ......... G06F 16/2477 707/999.006 |
| 2005/0144532 | A1 * | 6/2005 | Dombrowa ......... G06F 11/3495 714/39 |
| 2009/0038001 | A1 | 2/2009 | Bozak et al. |
| 2012/0023432 | A1 * | 1/2012 | Aguren ................. G06F 11/328 715/772 |
| 2012/0284221 | A1 * | 11/2012 | Shelton ................... H04L 63/20 707/E17.014 |
| 2012/0303481 | A1 * | 11/2012 | LouisN'jai ............. G06Q 30/06 715/764 |
| 2013/0135119 | A1 * | 5/2013 | Swope, III ............... G08G 1/13 340/995.13 |
| 2014/0245082 | A1 | 8/2014 | Halverson et al. |
| 2014/0337491 | A1 * | 11/2014 | Barreto ................. G06F 16/182 709/221 |
| 2014/0344718 | A1 * | 11/2014 | Rapaport .............. H04L 67/306 715/753 |
| 2015/0081706 | A1 * | 3/2015 | Elmqvist Wulcan ........................ G05B 19/0428 707/746 |
| 2015/0089286 | A1 | 3/2015 | Knauth et al. |
| 2017/0060660 | A1 | 3/2017 | Gondi et al. |
| 2018/0097687 | A1 | 4/2018 | Brown |
| 2018/0157544 | A1 * | 6/2018 | Brown ................ G06F 11/0709 |
| 2018/0165173 | A1 * | 6/2018 | Lin ....................... G06F 16/285 |
| 2018/0285226 | A1 * | 10/2018 | Norrie ................... G06F 11/302 |
| 2019/0042323 | A1 * | 2/2019 | Shotton ................. H04L 67/535 |
| 2019/0098037 | A1 | 3/2019 | Shenoy et al. |
| 2019/0163603 | A1 | 5/2019 | Brown et al. |
| 2019/0205221 | A1 * | 7/2019 | Taubler ................. G06F 16/273 |
| 2019/0258730 | A1 | 8/2019 | Obradovic et al. |
| 2019/0287003 | A1 | 9/2019 | Sercinoglu et al. |
| 2019/0340057 | A1 * | 11/2019 | Brown ................ G06F 11/0778 |
| 2020/0201699 | A1 | 6/2020 | Yu et al. |
| 2020/0327103 | A1 * | 10/2020 | Anand ................ G06F 11/1469 |
| 2020/0372113 | A1 | 11/2020 | Thomas |
| 2020/0394159 | A1 | 12/2020 | Hurley et al. |
| 2021/0012238 | A1 * | 1/2021 | Gao .................... G06F 11/0793 |
| 2021/0191798 | A1 * | 6/2021 | Zhang ................. G06F 11/3476 |
| 2021/0397499 | A1 | 12/2021 | Pronk et al. |
| 2022/0121507 | A1 | 4/2022 | Jha et al. |
| 2022/0413982 | A1 | 12/2022 | Roy et al. |
| 2023/0123509 | A1 | 4/2023 | Wolf et al. |

* cited by examiner

700

| | Time Series ID 710 | Event ID 720 | Event Time 730 | Value 740 |
|---|---|---|---|---|
| 604(1) | <counter_key_rr> | token1 | 1635438610123999 | +2 |
| 604(2) | <counter_key_rr> | token2 | 1635438610125002 | +2 |
| 604(3) | <counter_key_rs> | token3 | 1635438610130908 | -2 |
| 604(4) | <counter_key_rr> | token1 | 1635438610123999 | +2 |

FIG. 7A

750

| | Counter Key 760 | Rollup Count 770 | Rollup Timestamp 780 |
|---|---|---|---|
| 752(1) | rr | 150 | 1635438610126000 |
| 752(2) | rs | 200 | 2025438610254676 |

FIG. 7B

ACCURATE GLOBAL EVENTUAL COUNTING

CROSS-REFERENCE TO RELATED APPLICATIONS

This application is a continuation of the co-pending U.S. patent application titled, "ACCURATE GLOBAL EVENTUAL COUNTING", filed on Mar. 1, 2022 and having Ser. No. 17/683,818, The subject matter of this related application is hereby incorporated herein by reference.

BACKGROUND

Field of the Various Embodiments

Embodiments of the present disclosure relate generally to distributed computing systems and, more specifically, to accurate global eventual counting.

Description of the Related Art

Distributed computing systems include many different hardware and software components that provide a variety of services to clients of the distributed computer systems. For example, a distributed computing system executing a video streaming service could provide access to a library of media titles that can be viewed on a range of different client devices. In another example, a distributed computing system could enable multiple users to collaborate by maintaining and updating assets based on contributions provided by at least some of the multiple users.

Tabulating and maintaining an accurate count for a given value in a globally-distributed environment is challenging. In particular, distributed computing systems have difficulty computing an accurate count reflecting events received from multiple sources in a short time period. For example, a central server may receive a large volume of votes from multiple users responding to a poll. However, the central server may need to process the received votes in parallel in order to quickly compute the actual count for the poll. Processing large volumes of events in such a manner strains the processing resources of a distributed computing system and often results in inaccurate counts.

Some conventional distributed computing systems address this issue by employing a leader-follower architecture to process events originating from multiple sources. In the lead-follower architecture, groups of follower devices, such as intermediate servers, receive events for a subset of users, then periodically replicate the received events by forwarding the events to a region leader. However, replication of such events to the region leader, which subsequently forwards the events to a single global leader, causes a large replication latency throughout the distributed computing system. Further, conventional distributed computing systems have difficulty controlling when follower devices receive events, such as when the follower device receives the same event multiple times or does not properly receive an event at all during data backup or replication operations. Such instances thereby cause the distributed computing system to overcount or undercount some of the events associated with a given count. As a result, conventional distributed computing systems, in lieu of maintaining an accurate count, instead maintain a best-effort counter that reflects an approximate count.

As the foregoing illustrates, what is needed in the art are more effective techniques to accurately determine a count for events occurring within a distributed computing system.

SUMMARY

Various embodiments of the present application set forth a computer-implemented method comprises receiving, from a first endpoint device, a first event during a first time period, modifying an event log to include a record associated with the first event, causing a rollup queue to include a request to count a first count value associated with the first event, and generating, in a second time period subsequent to the first time period, a counter value associated with at least the first event based on the rollup queue and the event log.

Other embodiments include, without limitation, a computer system that performs one or more aspects of the disclosed techniques, as well as one or more non-transitory computer-readable storage media including instructions for performing one or more aspects of the disclosed techniques.

At least one technological advantage of the disclosed techniques relative to the prior art is that the global event counter enables a device in a distributed computing system to maintain an accurate count of events received from multiple devices from multiple geographically-distant regions in the distributed computing system. In particular, by maintaining and aggregating an immutable log of events from multiple devices that is used to periodically rollup a counter value, the global event counter enables a distributed computing system to quickly maintain various types of counts, and also avoid overcounting or undercounting of events that are being counted through deduplication via one or more idempotency tokens. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 7A illustrates an example event log included in the example distributed computing system of FIG. 5, according to various embodiments of the present disclosure.

FIG. 7B illustrates an example rollup table included in the example distributed computing system of FIG. 5, according to various embodiments of the present disclosure.

DETAILED DESCRIPTION

Figure 1:
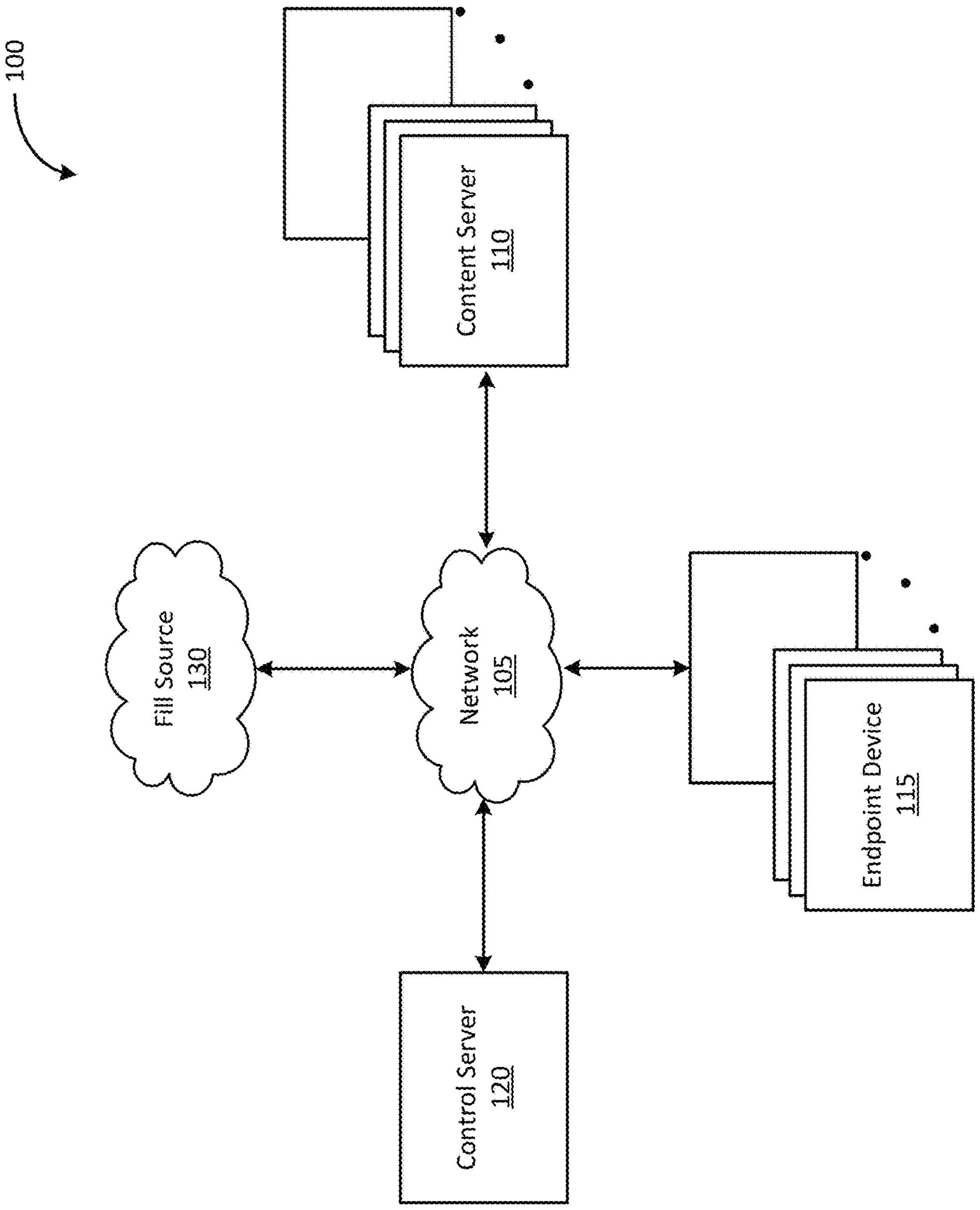
FIG. 1 illustrates an example network infrastructure that is configured to implement one or more aspects of the present disclosure.

In the following description, numerous specific details are set forth to provide a more thorough understanding of the various embodiments. However, it will be apparent to one skilled in the art that the inventive concepts may be practiced without one or more of these specific details.

Overview

Distributed computing systems include many different hardware and software components that provide a variety of services to clients of the distributed computer systems. A distributed computing system could enable multiple users to interact by maintaining assets and updating data based on contributions provided by contributing users. For instance, multiple users can submit votes to an online poll and subsequently view the results of the poll. Therefore, maintaining and transmitting an accurate count within the distributed computing system for multiple user submissions is an important component of user interaction.

In prior art techniques, various regions of the distributed computing system separately process user submissions. In particular, distributed computing systems have difficulty accurately computing a count of user submissions from multiple sources or multiple regions in a short time period. For example, a central server needs to process a large volume of votes submitted in parallel in order to quickly compute the actual count for the poll. Such techniques strain the processing resources of the distributed computing systems.

Some conventional distributed computing systems employ a leader-follower architecture in order to process events generated by users located in different regions. In a lead-follower architecture, a group of up-stream follower devices, such as intermediate servers, data centers, or exchange points, receive user submissions made in a given region. The follower devices process and store the events locally. The follower devices replicate the data into an eventually-consistent database by forwarding the events to a region leader or a global leader. A single controller for the eventually-consistent database converges the counts from the sources located within the multiple regions. However, replicating such events to the region leader or global leader results in latency throughout the distributed computing system due to the replication lag associated with completing replication operations. Further, the follower devices may miss incoming events due to performing the replication operations. Consequently, one drawback of the distributed computing system using such counting techniques is that the system cannot accurately count events from multiple regions in short time periods and also cannot provide an accurate count in response to requests for such counts. For example, conventional distributed computing systems, in lieu of maintaining an accurate count, instead distribute a best-effort counter that reflects an approximate count of events made over multiple regions. Thus, prior art techniques do not properly maintain an accurate count of events made over multiple regions of a distributed computing system.

In contrast, the disclosed techniques enable a global event counter service within the distributed computing system to maintain an accurate count of multiple events more efficiently by adding events to an immutable event log that periodically closes and is aggregated through the distributed computing system. The global event counter system also maintains a rolling count based on an accumulated set of submissions from multiple users, and reconciles the rolling count with the immutable entries included in the event log. The global event counter service can therefore compute an eventually-accurate count of the events received from multiple regions within a distributed computing system.

In various embodiments, the distributed computing system includes a global event counter that receives a set of user submissions to a question provided by multiple endpoints. Each of these user submissions is treated as an event to be counted. For each user submission, the global event counter generates a time-series event record that identifies the count value, the timestamp that the submission was made, a unique identifier that is used to deduplicate any replicants of the request, and the user that provided the submission. The global event counter enters the time-series event record into an immutable event log that maintains entries for each request made by endpoints within the distributed computing system. Every entry to the event log is additive and immutable. The global event counter waits for a period before rolling up the immutable events. Waiting for this period allows the user to subsequently provide other submissions to change the count value, such as providing multiple selections to a poll, within a short time period before the global event counter rolls up and counts the event in the given time period. In some embodiments, when the global event counter receives a selection made by a user outside of this window, the global eventual counter adds the request to the event log and counts the count value in a rollup during a subsequent period.

The global event counter also adds a rollup request to rollup and count the count value corresponding to the user submission to one of a plurality of queues. The global event counter periodically deduplicates the rollup requests in each of the queues before performing rollups of the respective requests and aggregating the resulting count values to generate an updated count value. The global event counter uses the updated count value to update an aggregated count, thus providing an accurate count of the events received via the multiple submissions. In some embodiments, the global event counter can receive requests for a specific submission by the user or for the aggregated count. The global event counter responds to the request for the aggregated count by retrieving the corresponding time-series event record from the immutable event log. The global event counter responds to the aggregated count by retrieving the aggregated count from a portion of memory storing the aggregated count. The global event counter responds to the request for the aggregated count by retrieving the last aggregated count from memory and optionally retrieving the remaining count from the corresponding time-series event records from the immutable event log past the last rollup checkpoint timestamp. The global event counter then transmits a response to the requesting device, where the response includes the aggregated count and/or the submission of the user.

Advantageously, a device in a distributed computing system that employs the disclosed global event counter addresses various limitations of conventional distributed computing systems that slowly determine an accurate count or do not maintain an accurate count of events made by a group of globally-distributed endpoint devices. More specifically, conventional devices computing counts in a distributed computing system would either slowly process a series of user submissions or generate an approximate count in lieu of an accurate count. As a result, conventional devices could not provide an accurate count to requesting devices.

By contrast, the device that employs the disclosed global event counter records events generated by multiple users and separately processes and aggregates a count value based on the events. Other devices within the distributed computing system can therefore request and quickly receive an accurate count that the global event counter generates. Further, by comparing the count value to the time-series event records included in the immutable event log, the global event counter generates an aggregated count value that accurately reflects the submissions made by users of the distributed computing system while avoiding overcounting or undercounting a particular submission made by a user.

System Overview

FIG. 1 illustrates an example network infrastructure that is configured to implement one or more aspects of the present disclosure. As shown, the network infrastructure 100 includes one or more content servers 110, a control server 120, and one or more endpoint devices 115, which are connected to one another and/or one or more cloud services 130 via a communications network 105. The network infrastructure 100 is generally used to distribute content to the content servers 110 and the endpoint devices 115.

Each endpoint device 115 (e.g., 115(1), 115(2), etc.) communicates with one or more content servers 110 (also referred to as "caches" or "nodes") via the network 105 to download content, such as textual data, graphical data, audio data, video data, and other types of data. The downloadable content, also referred to herein as a "file," is then presented to a user of the one or more endpoint devices 115. In various embodiments, the endpoint devices 115 can include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically-feasible computing platform that has network connectivity and is capable of presenting content, such as text, images, video, and/or audio content, to a user.

The network 105 includes any technically-feasible wired, optical, wireless, or hybrid network that transmits data between or among content servers 110, control server 120, endpoint device 115, cloud services 130, and/or other components. For example, the network 105 could include a wide area network (WAN), local area network (LAN), personal area network (PAN), WiFi network, cellular network, Ethernet network, Bluetooth network, universal serial bus (USB) network, satellite network, and/or the Internet.

Each content server 110 can include one or more applications configured to communicate with the control server 120 to determine the location and availability of various files that are tracked and managed by the control server 120. Each content server 110 can further communicate with the cloud services 130 and the one or more other content servers 110 to "fill" each content server 110 with copies of various files. In addition, the content servers 110 can respond to requests for files received from the endpoint devices 115. The files can then be distributed from the content server 110 or via a broader content distribution network. In some embodiments, the content servers 110 can require users to authenticate (e.g., using a username and password) before accessing files stored on the content servers 110. Although only a single control server 120 is shown in FIG. 1, in various embodiments, multiple control servers 120 (e.g., 120(1), 120(2), etc.) can be implemented to track and manage files.

In various embodiments, the cloud services 130 can include an online storage service (e.g., Amazon® Simple Storage Service, Google® Cloud Storage, etc.) in which a catalog of files, including thousands or millions of files, is stored and accessed in order to fill the content servers 110. The cloud services 130 also can provide compute or other processing services. Although only a single instance of the cloud services 130 is shown in FIG. 1, in various embodiments, multiple cloud services 130 and/or cloud service instances can be implemented.

Figure 2:
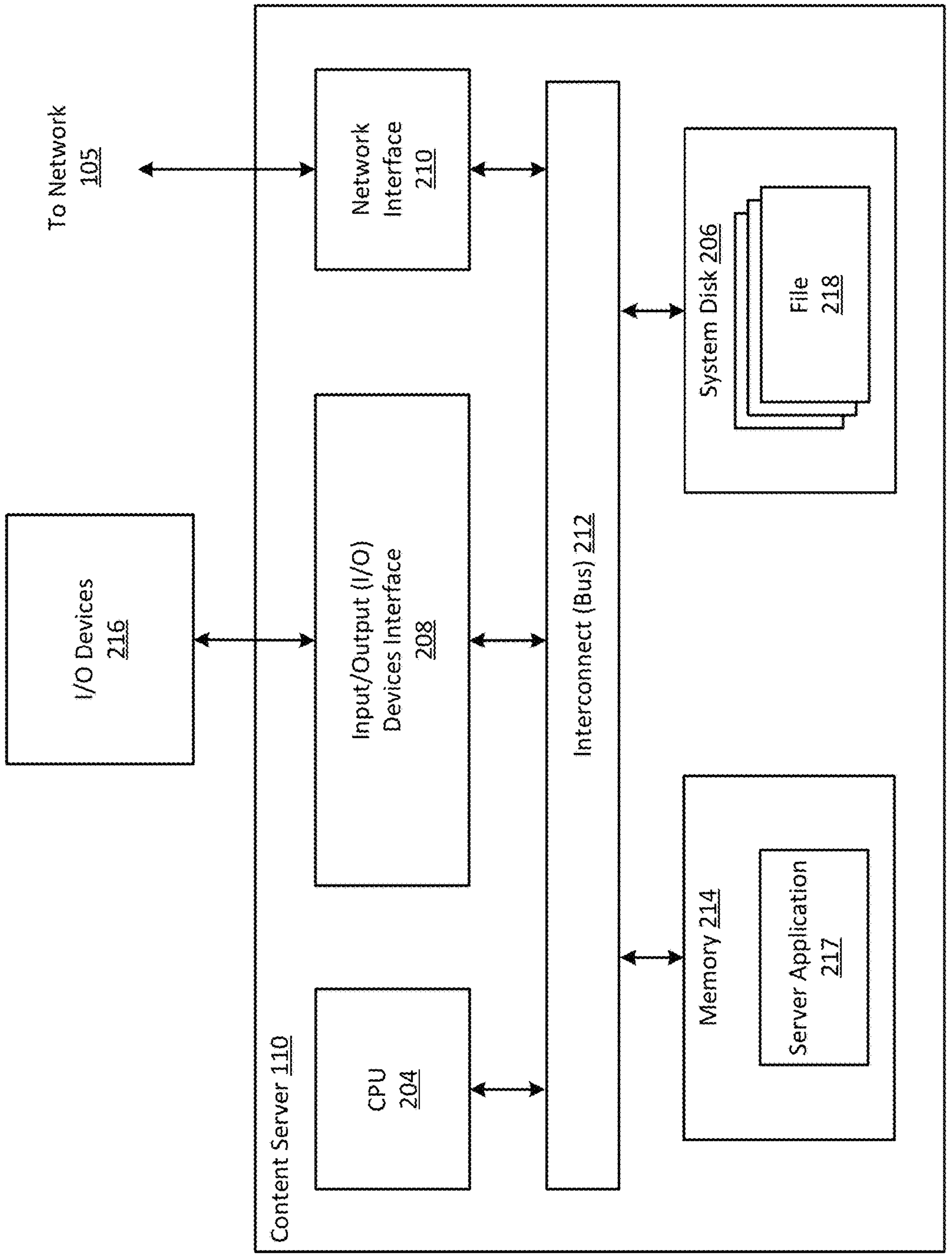
FIG. 2 is a more detailed illustration of the content server of FIG. 1, according to various embodiments of the present disclosure.

FIG. 2 is a more detailed illustration of the content server 110 of FIG. 1, according to various embodiments of the present disclosure. As shown, the content server 110 includes, without limitation, a central processing unit (CPU) 204, a system disk 206, an input/output (I/O) devices interface 208, a network interface 210, an interconnect 212, and a system memory 214.

The CPU 204 is configured to retrieve and execute programming instructions, such as a server application 217, stored in the system memory 214. Similarly, the CPU 204 is configured to store application data (e.g., software libraries) and retrieve application data from the system memory 214. The interconnect 212 is configured to facilitate transmission of data, such as programming instructions and application data, between the CPU 204, the system disk 206, the I/O devices interface 208, the network interface 210, and the system memory 214. The I/O devices interface 208 is configured to receive input data from the I/O devices 216 and transmit the input data to the CPU 204 via the interconnect 212. For example, the I/O devices 216 can include one or more buttons, a keyboard, a mouse, and/or other input devices. The I/O devices interface 208 is further configured to receive output data from the CPU 204 via the interconnect 212 and transmit the output data to the I/O devices 216.

The system disk 206 can include one or more hard disk drives, solid state storage devices, or similar storage devices. The system disk 206 is configured to store non-volatile data such as files 218 (e.g., audio files, video files, subtitle files, application files, software libraries, etc.). The files 218 can then be retrieved by the one or more endpoint devices 115 via the network 105. In some embodiments, the network interface 210 is configured to operate in compliance with the Ethernet standard.

The system memory 214 includes a server application 217, which is configured to service requests received from the endpoint device 115 and other content servers 110 for the one or more files 218. When the server application 217 receives a request for a given file 218, the server application 217 retrieves the requested file 218 from the system disk 206 and transmits the file 218 to an endpoint device 115 or a content server 110 via the network 105. The files 218 include digital content items such as video files, audio files, and/or still images. In addition, the files 218 can include metadata associated with such content items, user/subscriber data, etc. The files 218 that include visual content item metadata and/or user/subscriber data can be employed to facilitate the overall functionality of network infrastructure 100. In alternative embodiments, some or all of the files 218 can instead be stored in a control server 120, or in any other technically-feasible location within the network infrastructure 100.

Figure 3:
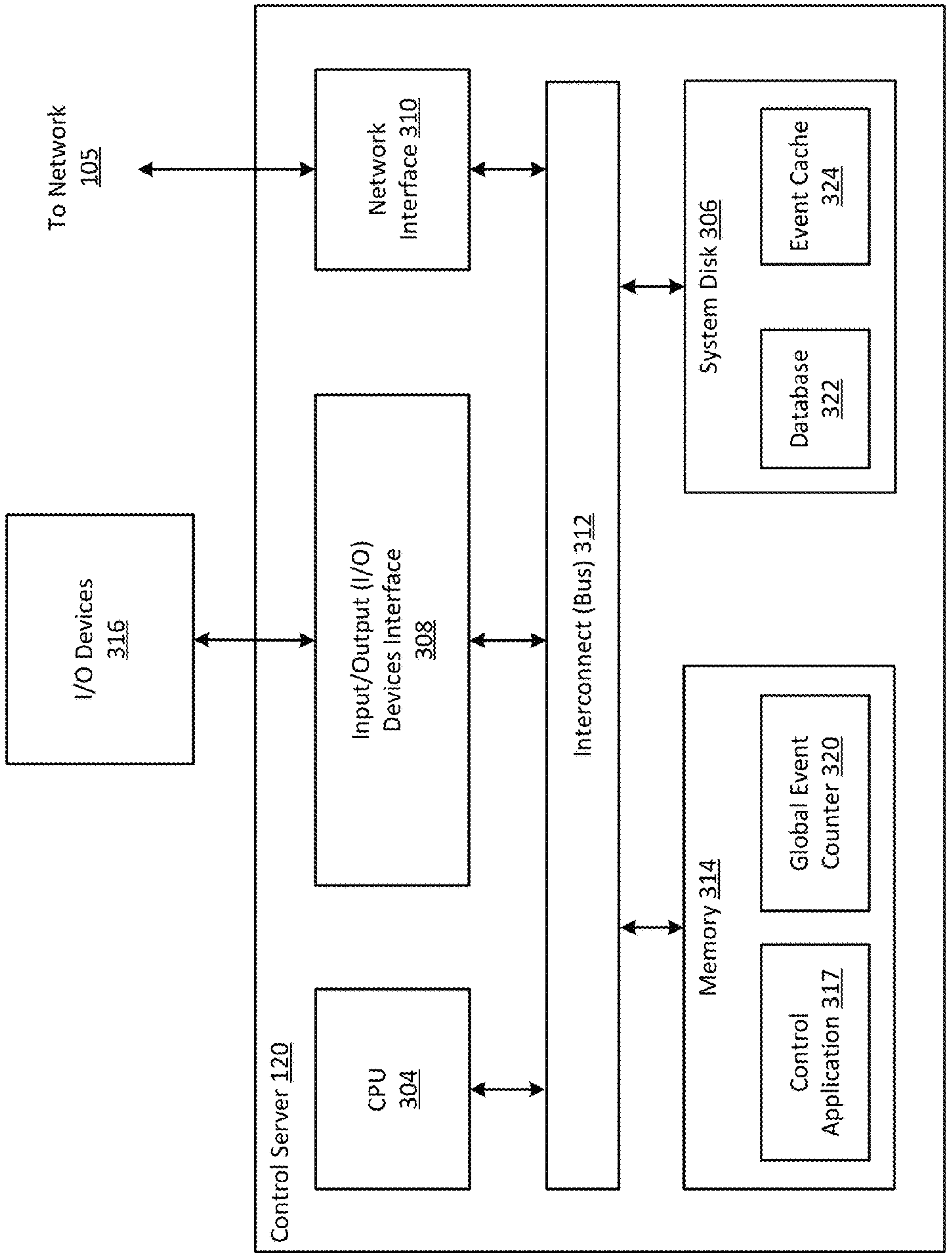
FIG. 3 is a more detailed illustration of the control server of FIG. 1, according to various embodiments of the present disclosure.

FIG. 3 is a more detailed illustration of the control server of FIG. 1, according to various embodiments of the present disclosure. As shown, the control server 120 includes, without limitation, a central processing unit (CPU) 304, a system disk 306, an input/output (I/O) devices interface 308, a network interface 310, an interconnect 312, and a system memory 314.

The CPU 304 is configured to retrieve and execute programming instructions, such as a control application 317, stored in the system memory 314. Similarly, the CPU 304 is configured to store application data (e.g., software libraries) and retrieve application data from the system memory 314 and a database 322 stored in the system disk 306. The interconnect 312 is configured to facilitate transmission of data between the CPU 304, the system disk 306, the I/O devices interface 308, the network interface 310, and the system memory 314. The I/O devices interface 308 is configured to transmit input data and output data between the I/O devices 316 and the CPU 304 via the interconnect 312.

The system disk 306 can include one or more hard disk drives, solid state storage devices, and the like. The system disk 306 is configured to store a database 322 of information associated with the content servers 110, the cloud services 130, and the files 218. In various embodiments, the system disk can also be configured to include an event cache 324 that stores information associated with various events, such as an aggregated count value that reflects a set of count values received via the one or more endpoint devices 115.

The system memory 314 includes a control application 317 configured to access information stored in the database 322 and process the information to determine the manner in which specific files 218 will be replicated across the content servers 110 included in the network infrastructure 100. The control application 317 can further be configured to receive and analyze performance characteristics associated with one or more of the content servers 110 and/or the endpoint devices 115. As noted above, in some embodiments, metadata associated with such visual content items, and/or user/subscriber data can be stored in the database 322 rather than in the files 218 stored in the content servers 110.

In various embodiments, the system memory 314 also includes a global event counter 320 that is configured to provide an accurate global eventual service for various events within the network infrastructure 100. In various embodiments, the global event counter 320 accesses the database 322 and/or the event cache 324 in order to record events received from various endpoint devices 115, determine an aggregated count value to reflect the events, and store the aggregated count value. For example, when a given event (e.g., a user vote) is placed, the global event counter 320 can record the event and queue a rollup request associated with the event, affording a small-time window to receive additional events from one or more endpoint devices 115 before a portion of an event log storing the event records closes. Once the window is closed (e.g., one minute), the global event counter performs a rollup that includes the count value. The global event counter also periodically performs specific rollups of a subset of events based on the presence of a rollup request in a queue such that the count values generated from performing multiple rollups converge to a single value ("aggregated count value") that is stored in the event cache 324. The single counter can accurately reflect the events that were added in the queue in a short time.

Figure 4:
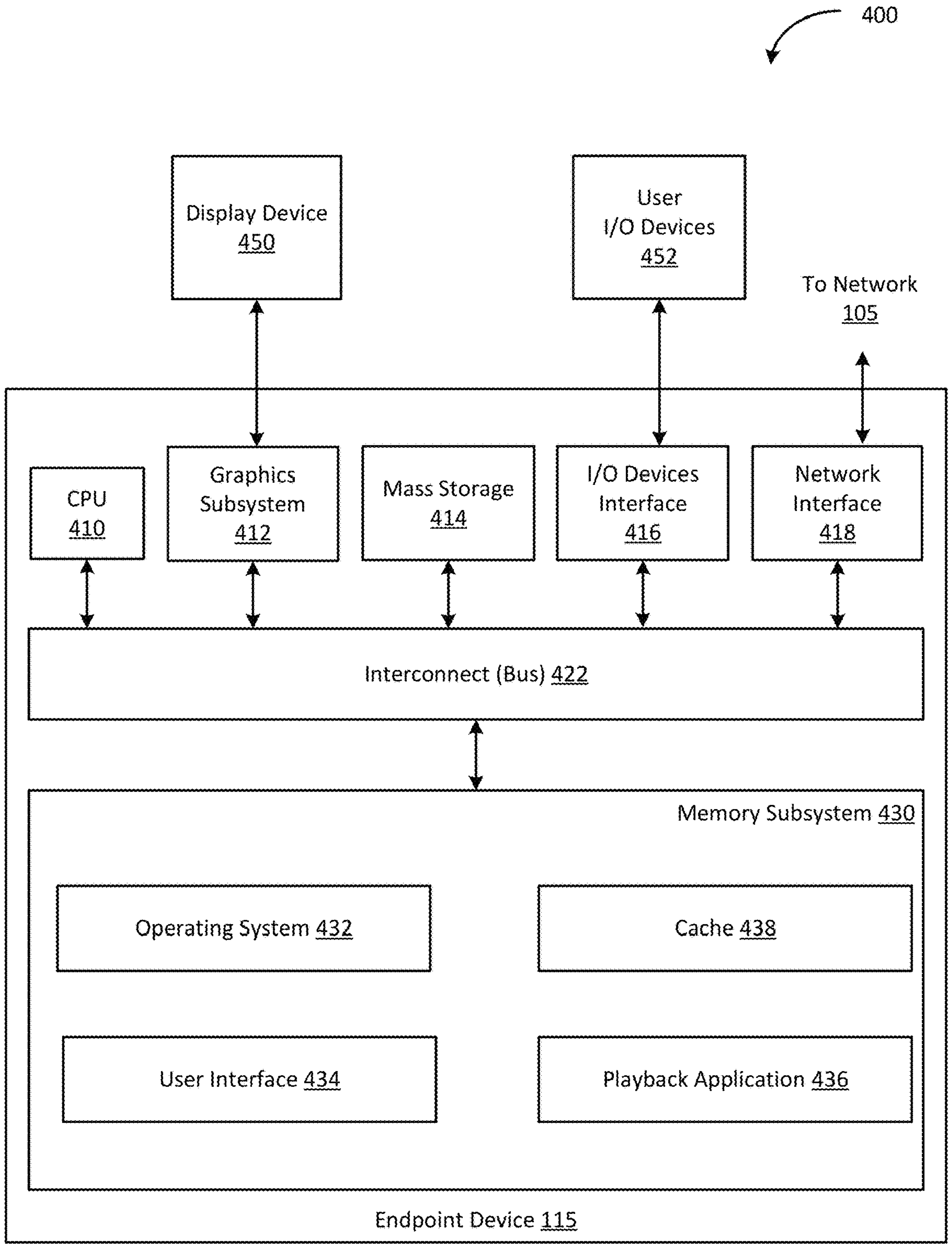
FIG. 4 is a more detailed illustration of the endpoint device of FIG. 1, according to various embodiments of the present disclosure.

FIG. 4 is a more detailed illustration of the endpoint device of FIG. 1, according to various embodiments of the present disclosure. As shown, endpoint device 115 can include, without limitation, a CPU 410, a graphics subsystem 412, an I/O devices interface 416, a mass storage unit 414, a network interface 418, an interconnect 422, and a memory subsystem 430.

In some embodiments, the CPU 410 is configured to retrieve and execute programming instructions stored in the memory subsystem 430. Similarly, the CPU 410 is configured to store and retrieve application data (e.g., software libraries) residing in the memory subsystem 430. The interconnect 422 is configured to facilitate transmission of data, such as programming instructions and application data, between the CPU 410, the graphics subsystem 412, the I/O devices interface 416, the mass storage unit 414, the network interface 418, and the memory subsystem 430.

In some embodiments, the graphics subsystem 412 is configured to generate frames of video data and transmit the frames of video data to display device 450. In some embodiments, the graphics subsystem 412 can be integrated into an integrated circuit, along with the CPU 410. The display device 450 can comprise any technically-feasible means for generating an image for display. For example, the display device 450 could be fabricated using liquid crystal display (LCD) technology, cathode-ray technology, and light-emitting diode (LED) display technology. The I/O devices interface 416 is configured to receive input data from the user I/O devices 452 and transmit the input data to the CPU 410 via the interconnect 422. For example, the user I/O devices 452 can include one or more buttons, a keyboard, and/or a mouse or other pointing device. The I/O devices interface 416 also includes an audio output unit configured to generate an electrical audio output signal. The user I/O devices 452 includes a speaker configured to generate an acoustic output in response to the electrical audio output signal. In alternative embodiments, the display device 450 can include the speaker. Examples of suitable devices known in the art that can display video frames and generate an acoustic output include televisions, smartphones, smartwatches, electronic tablets, and the like.

A mass storage unit 414, such as a hard disk drive or flash memory storage drive, is configured to store non-volatile data. The network interface 418 is configured to transmit and receive packets of data via the network 105. In some embodiments, the network interface 418 can be configured to communicate using the well-known Ethernet standard. The network interface 418 is coupled to CPU 410 via interconnect 422.

In some embodiments, the memory subsystem 430 includes programming instructions and application data that include an operating system 432, a user interface 434, a playback application 436, and a cache 438. The operating system 432 performs system management functions, such as managing hardware devices including the graphics subsystem 412, the mass storage unit 414, the I/O device interface 416, and the network interface 418. The operating system 432 also provides process and memory management models for the user interface 434, the playback application 436, and the cache 438. For example, the endpoint device 115 can execute the operating system 432 to write data to the cache 438 and/or sync data included in the cache 438 to the mass storage unit 414.

The user interface (UI) 434 can be, for example, a graphical user interface (GUI) employing a window-and-object metaphor, provides a mechanism for user interaction with the endpoint device 115. Persons skilled in the art will recognize the various operating systems 432 and/or user interfaces 434 that are suitable for incorporation into the endpoint device 115. In various embodiments, the user interface 434 can present various files in a file system, including one or more objects stored in the cloud services 130 and mounted as one or more files. In some embodiments, the endpoint device 115 can execute a headless configuration that does not include the UI 434.

The playback application 436 performs various playback functions associated with content items, such as displaying a GUI for content item selection and video playback of specific multimedia content items. The GUI employs a window-and-object metaphor to provide a mechanism for user interaction with the endpoint device 115. Persons skilled in the art will recognize various operating systems and/or user interfaces that are suitable for incorporation into the playback application 436. The playback application 436 is configured to request and/or receive content (e.g., the one or more files 218) from the content server 110 via the network interface 418. Further, the playback application 436 is configured to interpret the content and present the content via the display device 450 and/or the user I/O devices 452.

The cache 438 is a portion of volatile memory that stores the files 218, such as content items, portions of retrieved objects, and/or application data (e.g., secure application data, metadata, etc.). In various embodiments, the cache 438 can correspond to a section of nonvolatile memory. In some embodiments, the endpoint device 115 can sync data between the cache 438 and the mass storage unit 414 so that copies of data are stored in both the cache 438 and the mass storage unit 414.

Accurate Global Eventual Counting in a Distributed System

Figure 5:
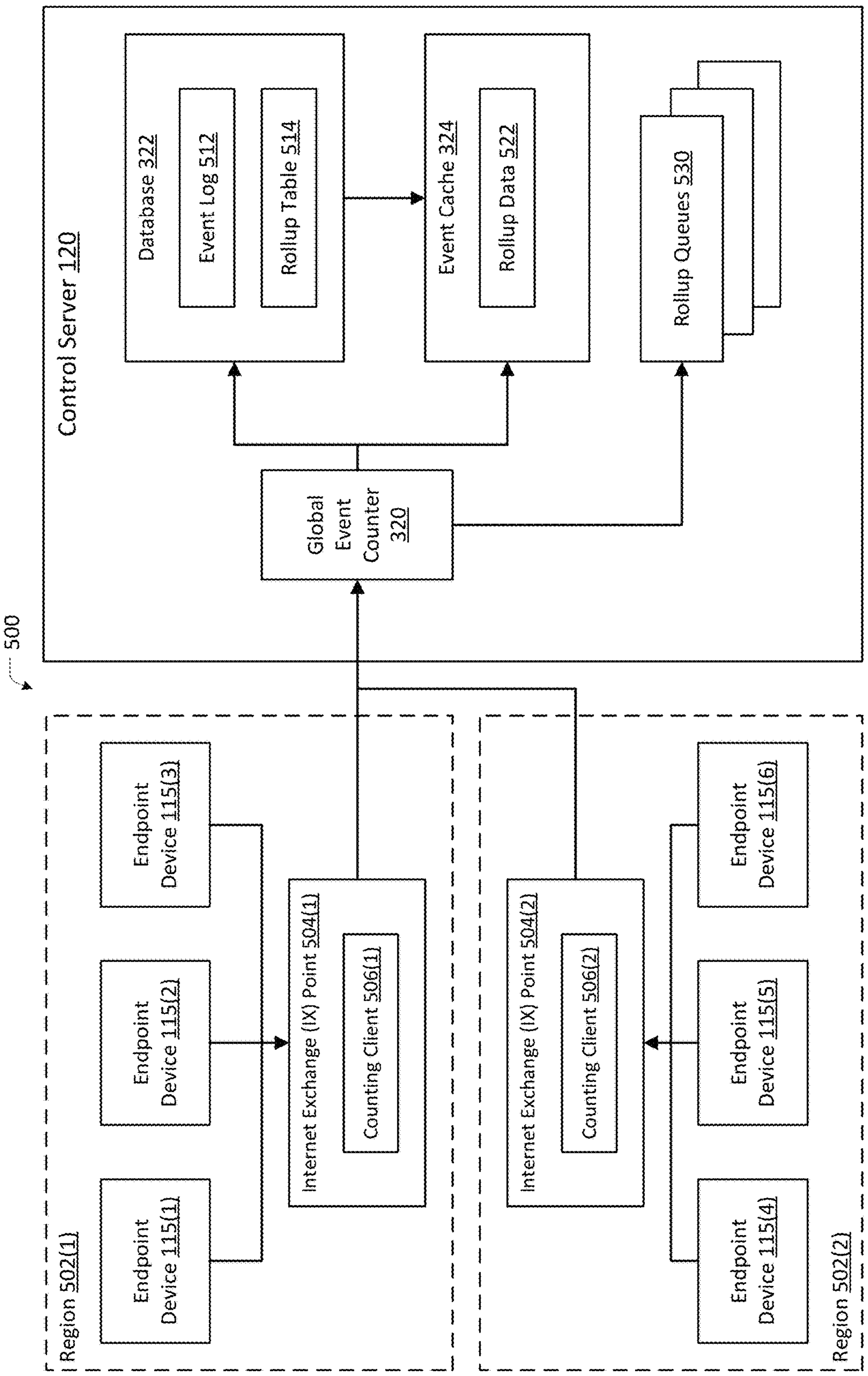
FIG. 5 illustrates another example network that is configured to implement one or more aspects of the present disclosure.

FIG. 5 illustrates another example network 500 that is configured to implement one or more aspects of the present disclosure. As shown, and without limitation, the network infrastructure includes regions 502, Internet exchange (IX) points 504, and the control server 120. The regions 502 include endpoint devices 115. The IX points 504 include counting clients 506. The control server 120 includes the global event counter 320, the database 322, the event cache 324, and rollup queues 530. The database 322 includes an event log 512 and a rollup table 514. The event cache includes rollup data 522.

In operation, the endpoint devices 115 separately generate events and transmit the events to the global event counter 320. The global event counter 320 processes each event by performing write procedures, where the global event counter 320 generates an event record and stores the event record in the event log 512. The global event counter 320 also extracts an identifier for the event and creates a counting action in the form of a rollup request, which the global event counter 320 places in one of a plurality of rollup queues 530. The global event counter 320 also performs various rollup procedures by maintaining a rollup window (e.g., a 1-minute to 5-minute time period) for a partition of the event log, where the global event counter 320 waits to receive events from various devices (e.g., from the endpoint devices 115 and/or the IX points 504 via replication) and processes the event records in the event log 512. At the end of the rollup window, the global event counter 320 deduplicates the event records from the event log 512. In various embodiments, the global event counter 320 also identifies rollup requests that are stored in the rollup queue and responds to a given rollup request by performing a rollup for a specific identifier. The global event counter 320 then combines the count values generated through performing the plurality of rollup requests included in the rollup queues 530 to generate an updated rollup count. The global event counter 320 stores the updated rollup count in the rollup table 514 and uses the updated rollup count to modify an aggregated count value that is stored in the rollup data 522.

When one or more endpoint devices 115 transmit requests for information associated with a specific count, the global event counter 320 responds by performing a read procedure to acquire information from the database 322 and/or the event cache 324. For example, the global event counter 320 could receive a request for the current count and the global event counter 320 could respond by retrieving the aggregated count value from the rollup data 522 and/or by retrieving the most-recent rollup count from the rollup table 514. In another example, the global event counter 320 could receive a request for information associated with a submission made by the user. In such instances, the global event counter 320 retrieves one or more event records from the event log 512 that correspond to the events generated by the user. The global event counter 320 transmits a response that includes the requested information to the endpoint device 115.

In various embodiments, the global event counter 320 can perform various write procedures, read procedures, and/or rollup procedures concurrently. For example, the global event counter 320 can perform a rollup procedure as part of a read procedure to determine an accurate aggregated count value provided in response to a request received from an endpoint device 115. In another example, the global event counter 320 can perform a read procedure in the background while performing one or more write procedures in parallel. Further, the global event counter 320 can cause a plurality of rollup procedures to operate in the background simultaneously.

Regions 502 (e.g., 502(1), 502(2), etc.) are geographically-distinct regions that each include endpoint devices 115. For example, the region 502(1) could be a region including endpoint devices 115(1)-115(3) in the eastern United States, while the region 502(2) could be a region including endpoint devices 115(4)-115(5) in southern Africa. In some embodiments, a region 502 can include one or more intermediate devices, such as intermediate servers (not shown) and/or IX points 504 that receive, process, and/or forward multiple events and/or request messages generated by the endpoint devices 115 within the region 502.

Internet Exchange (IX) points 504 are services or hardware (e.g., data centers) that connect to multiple participants, such as a set of endpoint devices 115. In some embodiments, the IX points 504 include a counting client 506 (e.g., 506(1), 506(2), etc.) that acts as an integration point for a user interface 434 of a given endpoint device 115. In some embodiments, the counting client 506 can process the events received from endpoint devices 115 within a given region. For example, the counting client 506(1) can process events received from the endpoint devices 115(1)-115(3) and store the corresponding event records locally in a local version of the event log (not shown) before performing replication operations to copy the data into the event log 514 stored in the control server 120.

Additionally or alternatively, in some embodiments, the counting client 506 can wait for specific periods (e.g., one minute) to receive multiple events from the same endpoint device before transmitting a set of events to the global event counter 320. For example, the counting client 506(2) could wait for a given time period and receive two events from the endpoint device 115(5). In some embodiments, the two events may include the same globally-unique token indicating a revote or a transmission retry by the endpoint device 115(5). In such instances, the counting client 506 can deduplicate the events received from the endpoint device 115(5) within the time period. Alternatively, the two events may include different globally-unique tokens, indicating multiple count events (e.g., submitting multiple answers to a multi-choice question). In such instances, the counting client may group the events into a single message and transmit the single message to the control server 120.

The global event counter 320 is a module included in the control server 120 that provides an accurate global eventual service for the various events. In various embodiments, the global event counter 320 accesses the database 322 and/or the event cache 324 in order to perform various write procedures, read procedures, and/or rollup procedures. For example, the global event counter 320 can access the database 322 and the event cache 324 to record events received from the endpoint devices 115, compute an aggregated count value to reflect the events, and store the aggregated count value.

The database 322 provides storage for various data structures associated with the global event counter 320 computing and managing an accurate count value for one or more counts (e.g., one or more polls, surveys, bets, etc.). In some embodiments, the database 322 is an active-active database that provides high availability of services and runs multiple instances of a service simultaneously. In such instances, the database 322 can perform various ordering services to order event records included in the event log 512 and/or the rollup table 514. In various embodiments, the database 322 may perform deduplication operations (e.g., deduplicating the memtable before flushing to disk).

The event log 512 is a globally-replicated portion of the database 322 that stores a set of events. In various embodiments, the event log 512 maintains the events as a set of immutable records that are time-ordered based on when the event occurred or when the global event counter 320 processed the event. In various embodiments, one or more IX points 504 may maintain regional versions of the event log and may periodically replicate the contents of the regional version of the event log with the event log 512 stored in the control server 120.

The event cache 324 is a portion of memory included in the control server 120 that stores the current count value as an aggregated count value for a given count. In various embodiments, the global event counter 320 performs a read procedure to acquire the current count value by retrieving the aggregated count value from the rollup data 522 stored in the event cache 324.

The rollup queues 530 (e.g., rollup queues 530(1), 530(2), etc.) are one or more portions of storage that store a set of rollup requests. In various embodiments, the global event counter 320 adds separate rollup requests to separate rollup queues in order to perform separate rollups that correspond to different counting events in parallel and/or deduplicate any duplicate rollup requests. For example, the control server 120 could include a global set of rollup queues 530, where each rollup queue 530 corresponds to a namespace for a user of the network infrastructure 100. In such instances, each rollup queue 530 serves as a user choice namespace, where the global event counter 320 performs rollups for separate users in parallel.

Figure 6:
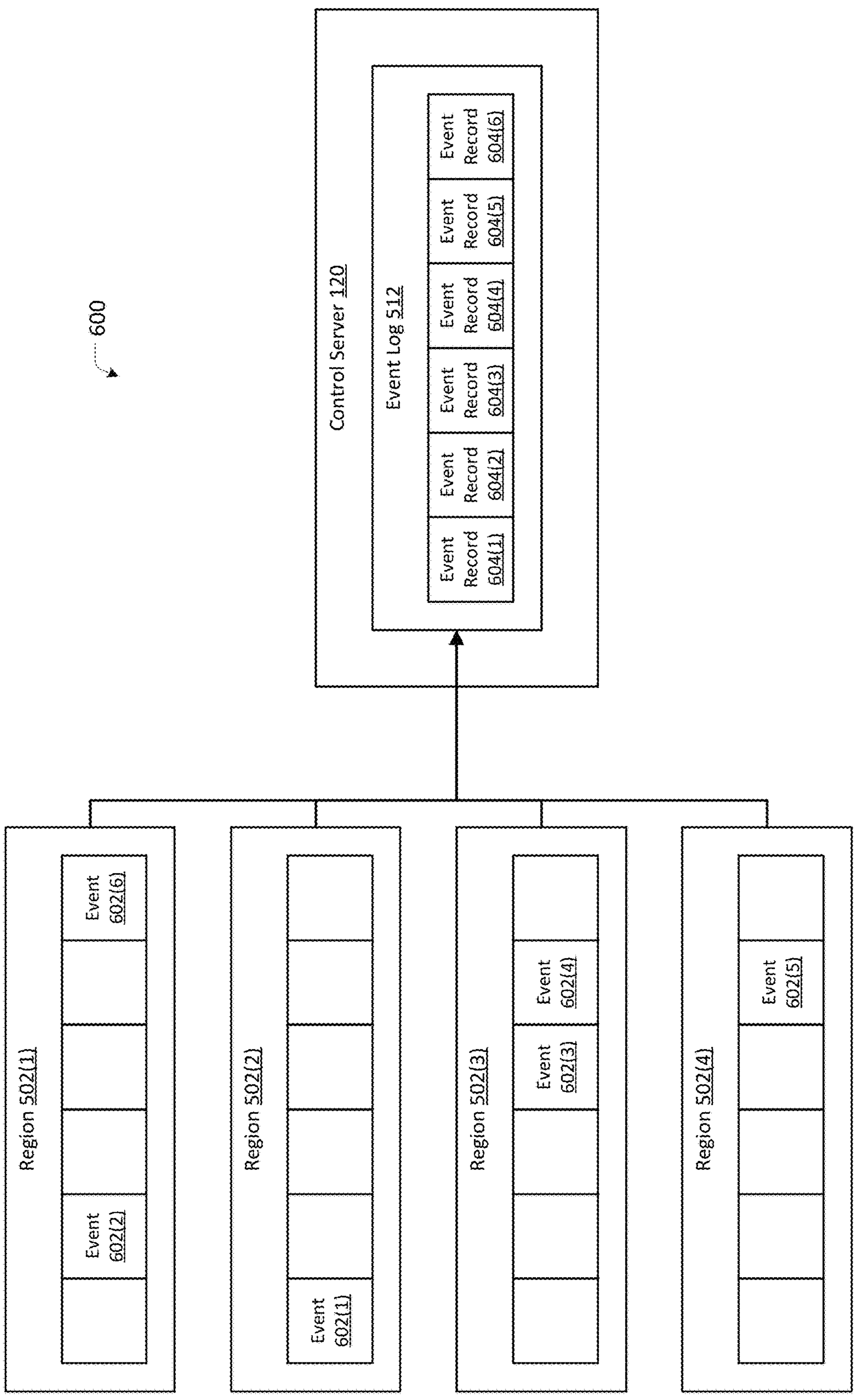
FIG. 6 illustrates a technique of combining a set of separate event logs to generate the immutable event log included in the example distributed computing system of FIG. 5, according to various embodiments of the present disclosure.

FIG. 6 illustrates a technique of combining a set of separate event logs to generate the immutable event log 512 included in the example distributed computing system of FIG. 5, according to various embodiments of the present disclosure. As shown, and without limitation, the network infrastructure 600 includes multiple regions 502 and the control server 120. Each region 502 includes one or more events 602. The control server 120 includes an event log 512 that includes a series of event records 604.

In operation, each region 502 can receive an event 602 associated with a count that the global event counter 320 maintains. The global event counter 320 receives the plurality of events and generates a set of event records 604 corresponding to each event 602. The global event counter 320 then orders the event records 604 and appends the event records to the event log 512. In some embodiments, the event log 512 can be partitioned into smaller partitions that are read-only and store a subset of event records 604. In some embodiments, the partitions can be time partitions that spread out the write operations performed by the global event counter 320. In some embodiments, the time partitions enable the global event counter 320 to quickly read events (e.g., in a few milliseconds). Additionally or alternatively, in some embodiments, the global event counter 320 can delete old time partitions in order to free disk space.

In various embodiments, each region can include multiple endpoint devices 115 that separately generate events associated with a specific count. For example, a first endpoint device 115(1) in region 502(1) can generate event 602(2) by submitting a vote on a poll that the global event counter 320 is managing. In such instances, the endpoint device 115 transmits the event 602(2) to the control server 120. In some embodiments, the endpoint device 115 can transmit the event 602(2) in a message via one or more intermediate devices, such as the Internet exchange point 504(1). In such instances, the counting client 506(1) can collect each event 602 generated in a given region and can forward the events 602 to the control server 120. In some embodiments, the counting client 506 can combine multiple events 602 into a single message and transmit the message to the control server 120.

In various embodiments, each region 502 can receive events 602 from endpoint devices 115. Additionally or alternatively, separate endpoint devices 115 can generate separate events concurrently. For example, a second endpoint device 115(2) within the region 502(3) could generate the event 602(4), while a third endpoint device 115(3) in the region 502(4) could concurrently generate the event 602(5). In such instances, the global event counter 320, upon receiving the events 602(4), 602(5) from the respective regions 502(3), 502(4), can order the corresponding event records 604 based on when the respective endpoint devices 115 transmitted the events (e.g., based on a timestamp included in the respective globally-unique tokens). Alternatively, in some embodiments, the event log 512 may be stored in an active-active database 322; in such instances, the active-active database can order the events 602(4), 602(5) in lieu of the global event counter 320.

The global event counter 320 receives the events 602 from each of the regions 502(1)-502(4). For each received event, the global event counter 320 generates a corresponding event record 604 that includes the information from the event 602. For example, the event 602 could include the question associated with a specific count (e.g., a first poll) and a count value (e.g., the answer provided by the user for the first poll). In such instances, the global event counter 320 can generate a corresponding event record 604 that includes this information, as well as a timestamp indicating when the endpoint device 115 generated the event. Alternatively, in some embodiments, the timestamp indicates when the global event counter 320 generated the event record 604. Additionally or alternatively, in some embodiments, the global event counter 320 can store the event records as a sequence of time-series event records 604 and can partition the event log 512 into separate read-only partitions that include subsets of the time-series event records in order to enable faster read/write access and/or replication throughout the network infrastructure 600. In various embodiments, the global event counter 320 and/or the database 322 globally replicates each of the events 602 in each region 502.

FIG. 7A illustrates an example event log 700 included in the example distributed computing system of FIG. 5, according to various embodiments of the present disclosure. As shown, and without limitation, the event log 700 includes a time series identifier field 710, an event identifier field 720, an event time field 730, a count value field 740 and time-series event records 604 (e.g., 604(1), 604(2), etc.).

In operation, the global event counter 320 generates event records 604 with values for one or more of the fields 710-740 in the event log 700. In some embodiments, the global event counter 320 extracts information from an event 602 in order to generate a corresponding time-series event record 604. In some embodiments, the event log 700 can store different types of events, such as reset events that cause the global event counter 320 to reset a given count.

The time series identifier (ID) field 710 indicates the counter key based on the most-recent rollup of count values. In various embodiments, the time series ID value corresponds to a counter key that the global event counter 320 uses to determine whether any count values are not included in the aggregated count values stored in the event cache 324. For example, the counter key can correspond to a specific time period in which the endpoint device 115 generated the event 604, the global event counter 320 recorded the event record 604 and/or in which the global event counter 320 aggregated the count value in a rollup procedure. For example, the event records 604(1), 604(2), 604(3) could share a common time series ID value of an "rr" counter key, indicating that one or more endpoint devices 115 generated the corresponding events 602(1), 602(2), 602(4) within a common time period. The event record 604(3) has the time series ID value of an "rs" counter key, indicating that an endpoint device 115 generated the event record 604(3) after the rollup corresponding to the "rr" time series ID value.

In various embodiments, each event record 604 can include an idempotency token that acts as a globally-unique token that the global event counter 320 can use to order the event records 604, which enables the global event counter 320 to process multiple events from the same user (e.g., client retries), or deduplicate multiple events having the same idempotency token and preventing double counting of a given event 602. For example, the idempotency token can include values identified by the event identifier field 720 and the event time field 730. The event identifier field 720 includes a unique identifier (UUID) that the endpoint device 115 generates to identify a specific event. The event time field 730 indicates the time at which an endpoint device 115 made the event 602. In such instances, the global event counter 320 uses the respective values for the event time field 730 to order the event records 604.

In various embodiments, the values for the event ID field 720 and/or the event time 730 are specific to a particular user, device, or event. In such instances, the global event counter 320 can use the event ID value and/or the event time 730 in order to identify when the endpoint device 115 sent an event in multiple messages and the global event counter 320 generated multiple events 602 to the event log 700. The global event counter 320 can refrain from counting the count values of some time-series event records 604 (e.g., the event record 604(4)) when the event log 700 includes multiple records 604(1), 604(4) sharing the same idempotency token (e.g., a common event ID value and a common event time), thus preventing the global event counter 320 overcounting a single vote. Additionally or alternatively, the global event counter 320 can determine when a user voted multiple times within a given time period (e.g., the period following the most-recent rollup) and perform a rollup that includes the count value from each vote.

The count value field 740 indicates the count value extracted from the corresponding event 602. In some embodiments, the count value can be a single incremental value (+delta or −delta) corresponding to a vote, or a set of votes corresponding to a specific choice where multiple options are available (e.g., +delta for option A, +0 for option B, etc.). In some embodiments, the global event counter 320 manages different count types in addition to monotonically-increasing counts. Alternatively, in some embodiments, the count value may be different values, such as positive or negative integers (e.g., +7, −2, etc.), decimals, fractions, and so forth.

FIG. 7B illustrates an example rollup table 750 included in the example distributed computing system of FIG. 5, according to various embodiments of the present disclosure. As shown, and without limitation, the rollup table 750 a counter key field 760, a rollup count field 770, a rollup timestamp field 780, and rollup records 752 (e.g., 752(1), 752(2), etc.).

The counter key field 760 includes an identifier for a counter key that corresponds to a particular rollup procedure that the global event counter 320 performed. The rollup count field 770 indicates the count value upon performing the particular rollup procedure. The rollup timestamp field 780 includes a timestamp indicating when the rollup procedure was completed.

In operation, upon performing a rollup procedure, the global event counter 320 generates a rollup record that includes updated rollup data, including a rollup count value and a timestamp indicating when the rollup count was completed. In some embodiments, the global event counter 320 can retrieve the rollup count value of the most-recent rollup record 752 and provide the rollup count value as the current count. In some embodiments, the global event counter 320 acquires the timestamp of the latest rollup in order to determine whether any events 602 were generated subsequent to the last rollup. When the global event counter 320 determines that one or more events 602 have been generated subsequent to the last rollup, the global event counter 320 causes an immediate rollup of the newly-generated events and generates a new rollup record 752.

Techniques for Accurate Global Eventual Counting

Figure 8:
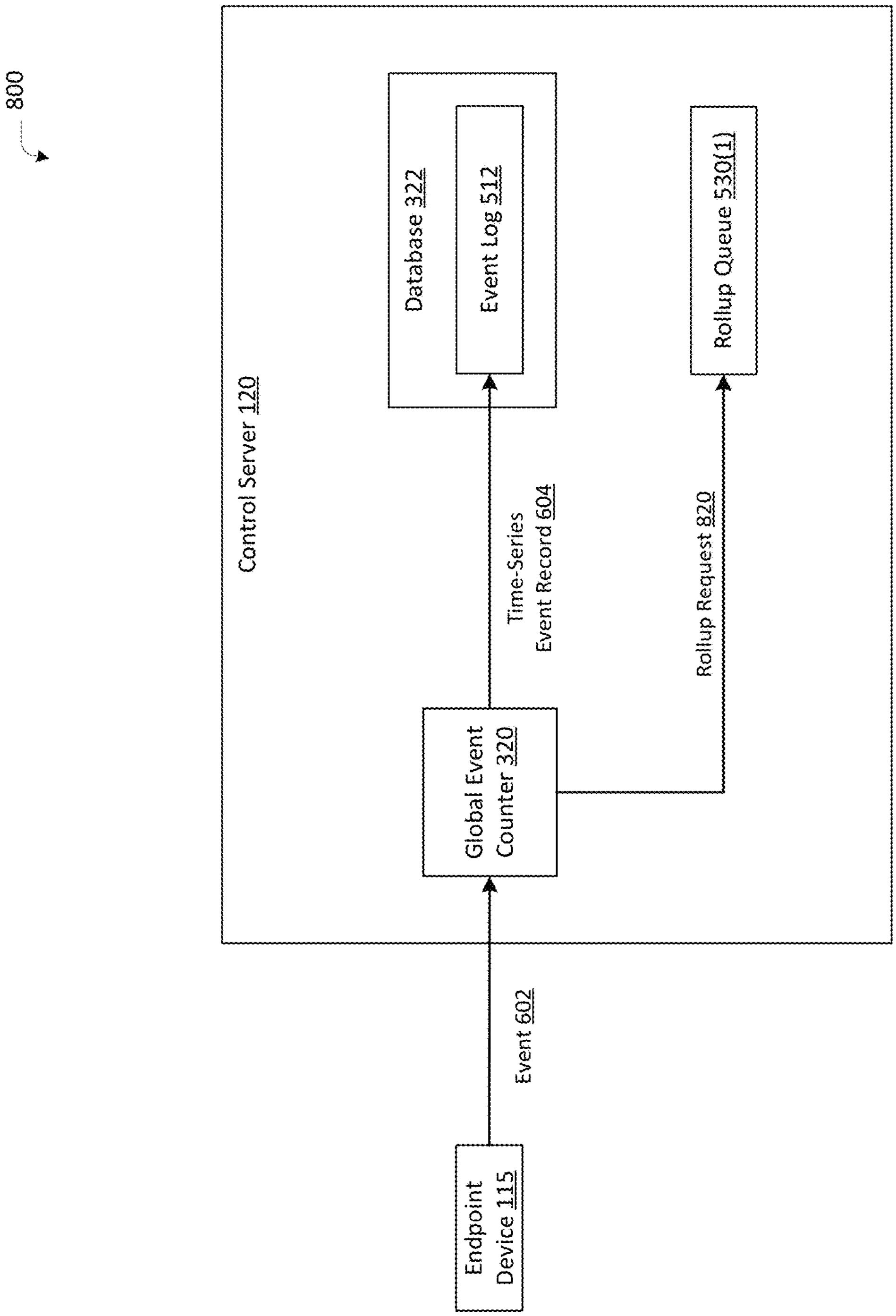
FIG. 8 illustrates a technique of executing a write path to add an event to the example distributed computing system of FIG. 5, according to various embodiments of the present disclosure.

FIG. 8 illustrates a technique of executing a write path to add an event to the example distributed computing system 500 of FIG. 5, according to various embodiments of the present disclosure. As shown, and without limitation, the network infrastructure 800 includes an endpoint device 115 and the control server 120. The control server includes the global event counter 320, the database 322 and a rollup queue 530(1). The database 322 includes the event log 512.

In operation, the global event counter 320 receives an event 602 from the endpoint device 115. The global event counter 320 generates a rollup request 820 corresponding to the count value and adds the rollup request 820 to a rollup queue 530(1). The global event counter 320 also generates a time-series event record 604 and adds the time-series event record 604 to the event log 512. In various embodiments, the global event counter 320 can perform parallel writes to the event log 512 and the rollup queue 530(1).

In various embodiments, when the global event counter 320 generates the time-series event record 604, the global event counter 320 extracts the count value from the event 602. In some embodiments, the count value can be a single incremental value corresponding to a vote (e.g., +1 or −1), or a set of votes corresponding to a specific choice where multiple options are available (e.g., +1 for option A, +0 for option B, etc.). Alternatively, in some embodiments, the count value can be different values, such as positive or negative integers (e.g., +7, −2, etc.), decimals, fractions, and so forth.

In various embodiments, a single user can provide multiple events 602 that have different count values. For example, the endpoint device 115 could initially submit a first event 602(1) with count value of +5, then submit a second event 602(2) with a count value of +1. In such instances, the global event counter 320 can generate separate rollup requests 820 (e.g., 820(1), 820(2)) corresponding to the respective events 602(1), 602(2) and can add the respective rollup requests 820(1), 820(2) to the rollup queue 530(1). The global event counter 320 can then deduplicate the rollup requests 820(1), 820(2) for the endpoint device 115 that are in the rollup queue 530(1) by only using one rollup request 820(1) to trigger a rollup count update associated with a counter key included in the rollup request 820(1).

Additionally or alternatively, when the global event counter 320 generates the time-series event record 604 from the event 602, the global event counter 320 can include various information in the time-series event record 604, such as a timestamp for when the event 602 was received, a globally-unique identifier (e.g., the idempotency token extracted from the event 602), a device identifier, interaction type, the specific question asked, the answer (which can include the count value), and/or other metadata. In various embodiments, the global event counter 320 can cause the time-series event record 604 to be appended to the event log 512 and cause a partition of the event log 512 to be read-only after a specific time period (e.g., after one minute). In various embodiments, the event log 512 can act as a source of truth for the count values that were included in the events 602 received by the global event counter 320.

In some embodiments, the time-series event record 604 can include additional information for use in the immutable event log 512, such as a globally-unique identifier. In such instances, the global event counter 320 can use the globally-unique identifier in order to identify multiple instances of the same event 602 that the global event counter 320 received. The global event counter 320 can deduplicate specific time-series event records 604 sharing the same idempotency token, thus preventing overcounting votes.

Figure 9:
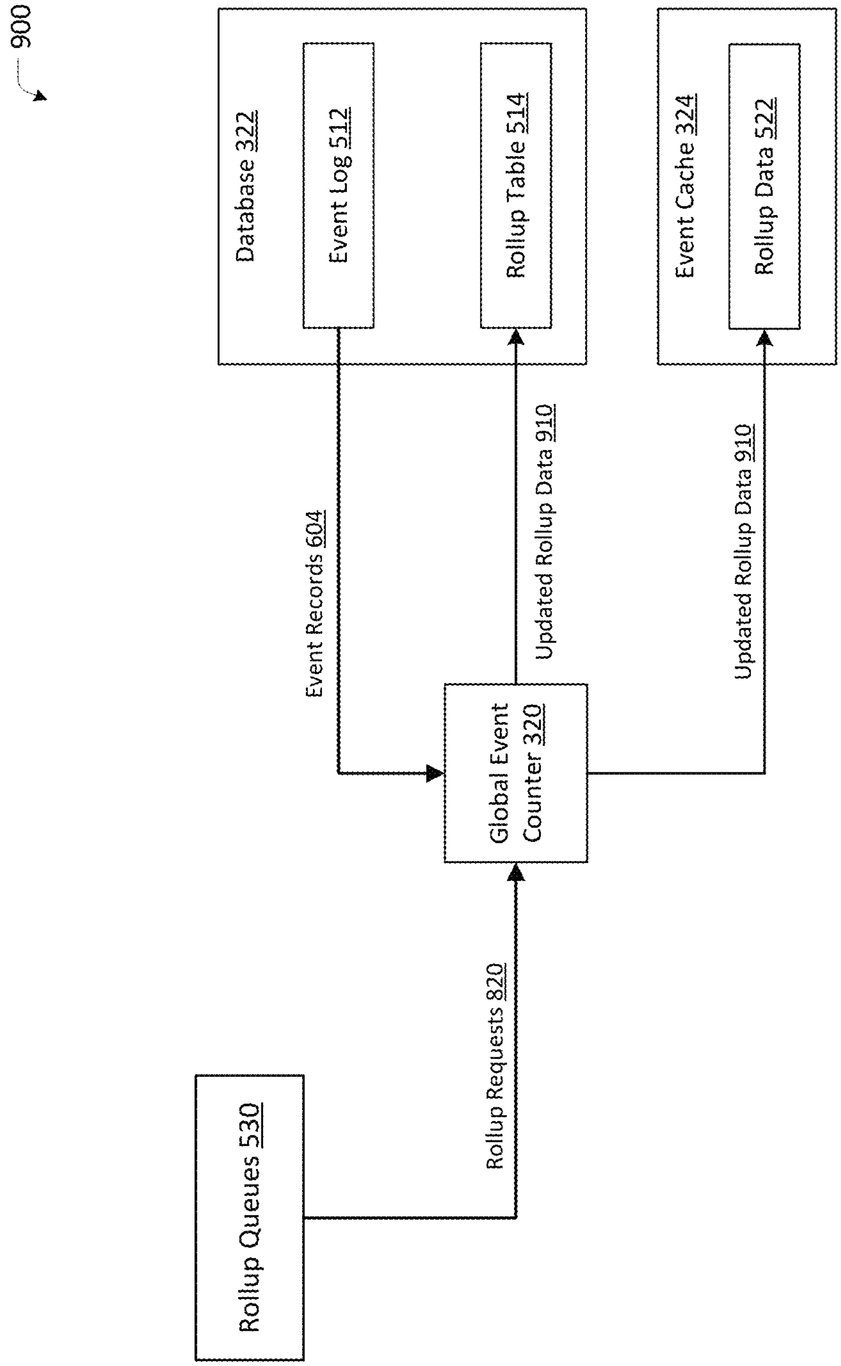
FIG. 9 illustrates a technique of executing a rollup event to update portions of the example distributed computing system of FIG. 5, according to various embodiments of the present disclosure.

FIG. 9 illustrates a technique of executing a rollup event to update portions of the example distributed computing system 500 of FIG. 5, according to various embodiments of the present disclosure. As shown, and without limitation, the control server 900 includes the global event counter 320, the database 322 and the event cache 324. The database 322 includes the event log 512 and the rollup table 514. The event cache 324 stores rollup data 522.

In operation, the global event counter 320 reads rollup requests 820 from the rollup queues 530 and responds by performing a rollup of time-series event records 604 that the event log 512 is storing. The global event counter 320 determines the count value based on the rollup of the time-series event records 604, generates a count value update and generates updated rollup data 910. The updated rollup data 910 includes the count value update and the time that the global event counter 320 performed the rollup. The global event counter 320 transmits the updated rollup data 910 to the rollup table 514 to record that the rollup has occurred. The global event counter 320 also transmits the updated rollup data 910 to the event cache 324 for storage, where the updated rollup data 910 includes a count value update that modifies the aggregated count value to accurately reflect the count value from the rollup.

In various embodiments, the global event counter 320 can wait for a specific time period before performing a rollup. For example, the global event counter 320 could refer to the most recent record in the rollup table 514 and determine the rollup timestamp value. The global event counter 320 could then set the threshold time period to a specific time after the determined rollup timestamp value (e.g., a value corresponding to 120 seconds after the determined rollup timestamp value). Upon determining that the threshold time period has elapsed, the global event counter 320 can cause a set of rollup requests 820 stored in the respective rollup queues 530 to determine whether any new count actions 820 were added.

In various embodiments, for each rollup queue 530, the global event counter 320 can deduplicate multiple rollup requests 820. For example, the global event counter 320 could deduplicate three rollup requests 820 added to a specific rollup queue 530. In some embodiments, the control server 120 can include separate rollup queues 530 for each user or for each endpoint device 115. In such instances, the global event counter 320 filters the rollup queues 530 to identify the subset of rollup queues 530 that include new rollup requests 820. For example, the global event counter 320 could filter a global set of one million rollup queues to a subset of 1000 rollup queues 530 that are currently storing rollup requests 820. Upon identifying the subset of rollup queues 530, the global event counter 320 could in parallel perform rollups for the specific events associated with the respective rollup requests 820.

In some embodiments, the global event counter 320 can respond to one or more rollup requests 820 by querying the event log 512 for the set of time-series event records 604 that were added since the previous rollup. Additionally or alternatively, the global event counter 320 could perform a rollup of time-series event records 604 that are associated with a common counter key and/or user. In some embodiments, the global event counter 320 can reconcile each rollup request 820 included in the rollup queues 530 with one or more time-series event records 604 included in the event log 512.

In some embodiments, upon reconciling each of the stored rollup requests 820, the global event counter 320 can aggregate the determined count values and generates a count value update. For example, the global event counter 320 could perform a set of rollups that include 842 votes of +1 and 158 votes of −1 to generate a count value update of +684. The global event counter 320 generates the updated rollup data 910 to include the count value update and a rollup timestamp value corresponding to when the global event counter 320 generates the count value update.

In some embodiments, the global event counter 320 can transmit the updated rollup data 910 to the rollup table 514, where the updated rollup data 910 is added as an entry in the rollup table 514 to indicate that the global event counter 320 has performed a rollup of a set of rollup requests 820 at a specific time. In some embodiments, the global event counter 320 can use the rollup timestamp value as a threshold time, where the global event counter 320 generates locks to block computation or other processing of time-series event records 604 and/or events 602 that have timestamps predating the rollup timestamp value. Additionally or alternatively, the global event counter 320 can indicate that all partitions predating the rollup timestamp value are read-only.

In various embodiments, the global event counter 320 can transmit the updated rollup data 910 to the event cache 324. In such instances, the global event counter 320 can modify the rollup data 522 stored in the event cache 324 based on the updated rollup data 910. For example, the event cache 324 can store in the rollup data 522 an aggregated count value of +547,125. The global event counter 320 can modify the aggregated count value with the count value update of +684 such that the rollup data 522 includes an aggregated count value of +547,809. In such instances, the global event counter 320 can retrieve the aggregated count value from the event cache 324 and can transmit the aggregated count value to requesting devices.

Figure 10:
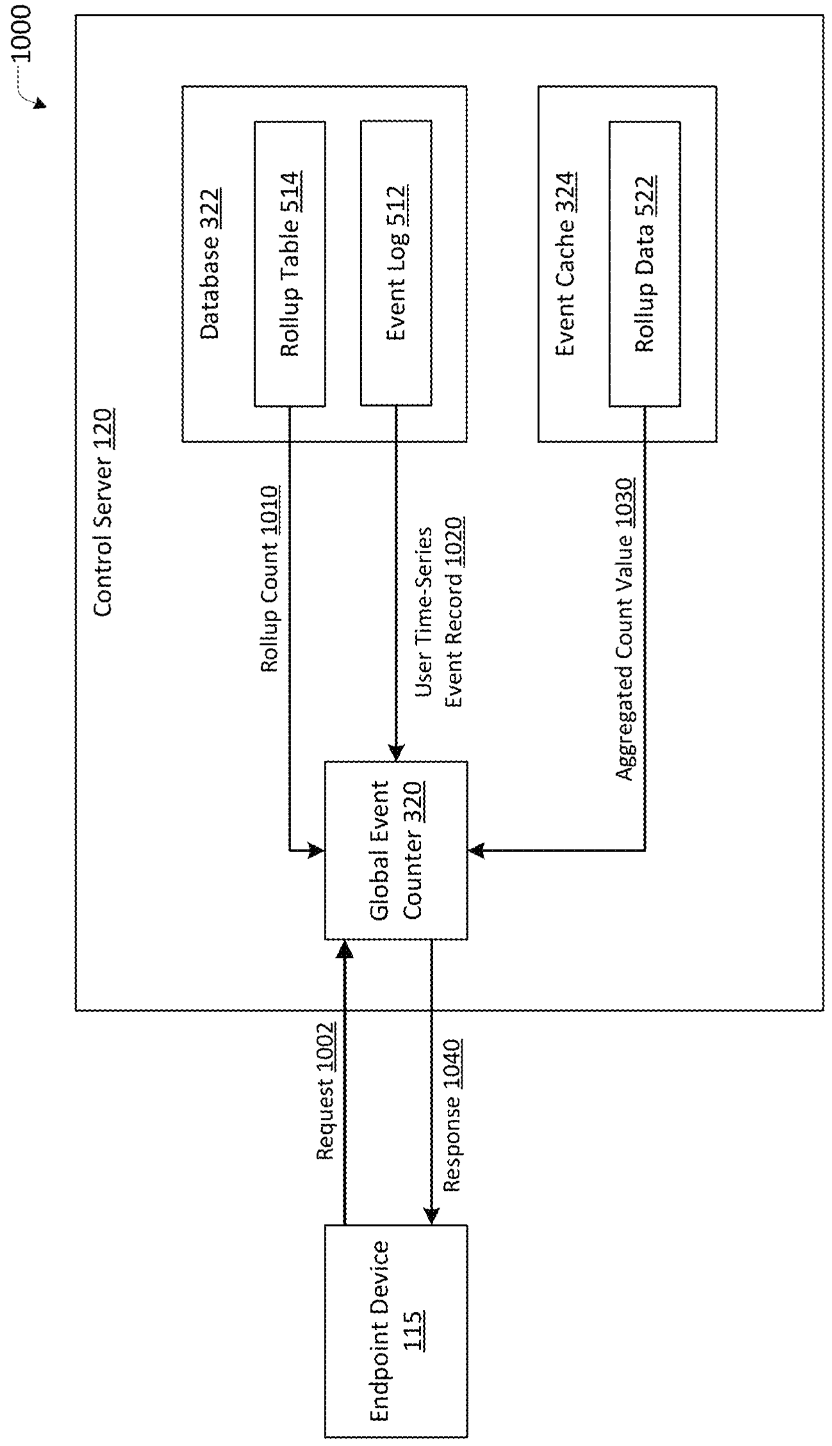
FIG. 10 illustrates a technique of executing a read path to retrieve data stored in the example distributed computing system of FIG. 5, according to various embodiments of the present disclosure.

FIG. 10 illustrates a technique of executing a read path to retrieve data stored in the example distributed computing system 500 of FIG. 5, according to various embodiments of the present disclosure. As shown, and without limitation, the network infrastructure 1000 includes an endpoint device 115 and the control server 120. The control server 120 includes the global event counter 320, the database 322 and the event cache 324. The database 322 includes the event log 512 and the rollup table 514. The event cache 324 stores rollup data 522.

In operation, the global event counter 320 receives a request 1002 for various information associated with a count. The global event counter 320 responds to the request 1002 by identifying the information specified in the request and retrieving the information from the applicable source in the database 322 and/or the event cache 324. The global event counter 320 receives the information and includes the information in a response 1040 that the global event counter 320 causes the control server 120 to transmit to the endpoint device 115.

In various embodiments, the endpoint device 115 can generate a request for information associated with the count. In some embodiments, the endpoint device 115 can request the current count (e.g., the total number of votes in a poll, the distribution of votes for the poll, etc.). Additionally or alternatively, the endpoint device 115 can request the user's submission (e.g., the choice the user made for the poll). In such instances, the global event counter 320 can retrieve the current count by retrieving the aggregated count value 1030 from the event cache 324 and/or retrieving a rollup count 1010 from the rollup table 514 upon performing an immediate rollup of any outstanding rollup requests 820 stored in the rollup queues 530. The global event counter 320 can also receive the user's submission by retrieving the applicable user time-series event records 1020 from the event log 512.

In various embodiments, the global event counter 320 can, upon determining that the request 1002 includes a request for the current count, retrieve the aggregated count value 1030 from the event cache 324. The aggregated count value 1030 reflects the count value when the global event counter 320 last performed a rollup. Additionally or alternatively, the global event counter 320 can trigger an immediate rollup and, upon performing the rollup, retrieve the rollup count 1010 from the rollup table 514. In some embodiments, the global event counter 320 can retrieve the rollup count 1010 in the background when the aggregated count value 1030 exists; otherwise, the global event counter 320 can retrieve the rollup count 1010 in the foreground.

In various embodiments, the global event counter 320 can determine that the request 1002 includes a request associated with the events 602 made by the user. For example, the request 1002 could include a request for the user's submission to a poll. In such instances, the global event counter 320 retrieves the applicable user time-series event record 1020 from the event log 512 and includes information from the user time-series event record 1020 in a response 1040 that the control server 120 transmits to the endpoint device 115. For example, the global event counter 320 can include a poll question and the user's selection in the response 1040.

In some embodiments, the global event counter 320 can include the current count and the information associated with the user's event 602 in the response 1040. In such instances, the endpoint device 115 can use the information included in the response 1040 in order to display the data to the user. For example, the endpoint device 115 could receive a response 1040 that includes the poll question, the aggregated count value 1030 (including a distribution of counts for each poll choice), and the user's answer. The endpoint device 115 could then, via the user interface 434, display a screen that displays the user's selection, available poll choices, and the count values for each selection, reflecting the accurate count as determined by the global event counter 320.

Figure 11:
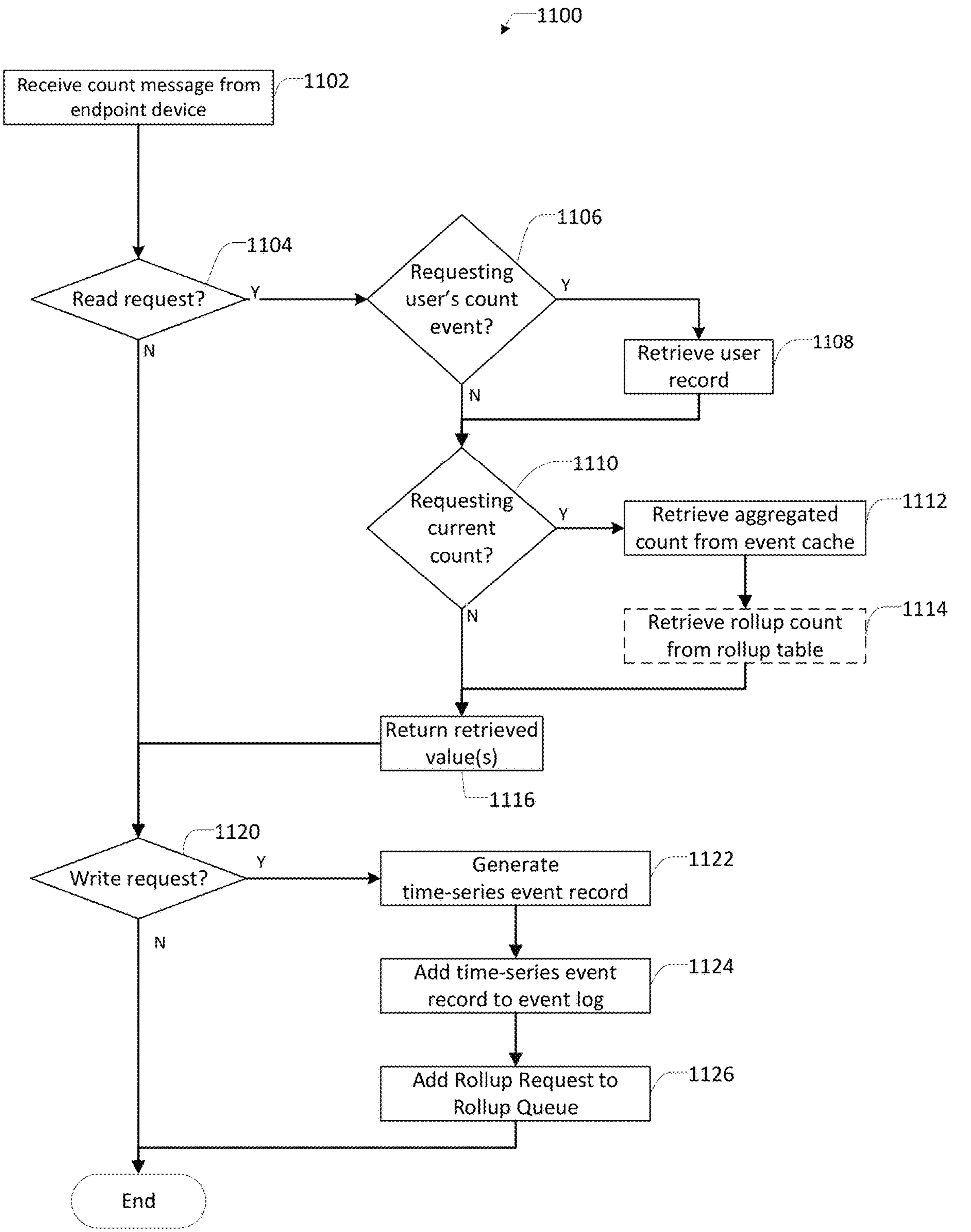
FIG. 11 sets forth a flow diagram of method steps for handling a count request in the distributed computing system of FIG. 5, according to various embodiments of the present disclosure.

FIG. 11 sets forth a flow diagram of method steps for handling a count request in the distributed computing system of FIG. 5, according to various embodiments of the present disclosure. Although the method steps are described with reference to the systems and call flows of FIGS. 1-10, persons skilled in the art will understand that any system configured to implement the method steps, in any order, falls within the scope of the present disclosure.

Method 1100 begins at step 1102, where the global event counter 320 receives a count message from an endpoint device 115. In various embodiments, the global event counter 320 can receive a message from an endpoint device 115 and/or an Internet exchange point 504 that is related to a count that the global event counter 320 is maintaining. In various embodiments, the global event counter 320 can receive sets of messages containing events 602; in such instances, the global event counter 320 can perform write procedures to write the events 602 into memory and add the count values to an aggregated count value 1030. Additionally or alternatively, the global event counter 320 can receive a message including a request 1002 for various information associated with a count.

At step 1104, the global event counter 320 determines whether the received message includes a read request. In various embodiments, the global event counter 320 can determine that the message includes a request for stored information associated with a count. In various embodiments, the endpoint device 115 can generate a request for information associated with the count. In some embodiments, the endpoint device 115 can request the current count (e.g., the total number of votes in a poll, the distribution of votes for the poll, etc.). Additionally or alternatively, the endpoint device 115 can request the user's submission (e.g., the choice the user made for the poll). When the global event counter 320 determines that the received message includes a read request, the global event counter 320 proceeds to step 1106; otherwise, the global event counter 320 determines that the received message does not include a read request and proceeds to step 1120.

At step 1106, the global event counter 320 determines whether the received message is requesting information associated with the user's event 602. For example, the request 1002 could include a request for the user's submission to a poll. When the global event counter 320 determines that the message includes a request for information associated with the user's event 602, the global event counter 320 proceeds to step 1108; otherwise, the global event counter 320 proceeds to step 1110. At step 1108, the global event counter 320 retrieves the applicable user time-series event record 1020 from the event log 512. In various embodiments, the global event counter 320 can use various identifying information (e.g., user id, idempotency token, timestamp, etc.) to identify the time-series event record 604 stored in the event log 512 that is applicable to the requesting user.

At step 1110, the global event counter 320 determines whether the received message is requesting the current count. When the global event counter 320 determines that the received message includes a request for the current count, the global event counter 320 proceeds to step 1112; otherwise, the global event counter 320 proceeds to step 1116. At step 1112, the global event counter 320 retrieves the aggregated count value 1030 from the event cache 324. The aggregated count value 1030 reflects the count value when the global event counter 320 last performed a rollup. In some embodiments, the global event counter 320 can optionally, at step 1114, retrieve the rollup count 1010 from the rollup table 514; in such instances, the global event counter 320 can retrieve the rollup count 1010 upon performing an immediate rollup. In some embodiments, the global event counter 320 can optionally retrieve the rollup count 1010 in the background when the aggregated count value 1030 exists. Alternatively, the global event counter 320 can retrieve the rollup count 1010 in the foreground when the global event counter 320 determines that the event cache 324 is not storing the aggregated count value 1030.

At step 1116, the global event counter 320 returns the retrieved values to the requesting device. In various embodiments, the global event counter 320 can generate a response message 1040 that includes the requested information, such as the aggregated count value 1030 and the information extracted from the user time-series event record 1020. In such instances, the endpoint device 115 can use the information included in the response 1040 in order to display the data to the user. For example, the endpoint device 115 could receive a response 1040 that includes the poll question, the aggregated count value 1030 (including a distribution of counts for each poll choice), and the user's answer. The endpoint device 115 could then via the user interface 434 display a screen that displays the user's selection, available poll choices, and the count values for each selection, reflecting the accurate count as determined by the global event counter 320.

At step 1120, the global event counter 320 determines that the received message includes a write request. In various embodiments, the global event counter 320 can determine that the received message includes an event 602. In such instances, the global event counter 320 can generate a rollup request 820 in order to add the count value of the event 602 to an aggregated count value 1030. The global event counter 320 can also generate a time-series event record 604 in order to record that the event 602 occurred. When the global event counter 320 determines that the received message includes the write request, the global event counter 320 proceeds to step 1122; otherwise, the global event counter 320 ends method 1100.

At step 1122, the global event counter 320 generates a time-series event record 604 based on the event 602 included in the received message. In various embodiments, the global event counter 320 generates a time-series event record 604 that includes various information associated with the event 602, such as a timestamp for when the event 602 was received, a user identifier, a device identifier, interaction type, the specific question asked, the answer (which can include the count value), and/or other metadata. At step 1124, the global event counter 320 causes the time-series event record 604 to be written to the event log 512.

At step 1126, the global event counter 320 adds a rollup request 820 to a rollup queue 530. In various embodiments, the global event counter 320 generates the rollup request 820 by extracting the count value from the event 602. In some embodiments, a single user can provide multiple events 602. In such instances, the global event counter 320 can generate separate rollup requests 820(1), 820(2) corresponding to the respective events 602(1), 602(2) and can add the respective rollup requests 820(1), 820(2) to the rollup queue 530. The global event counter 320 can then deduplicate the rollup requests 820(1), 820(2) from in the rollup queue 530 by only using one of the rollup requests 820(1) to trigger a rollup count update.

Figure 12:
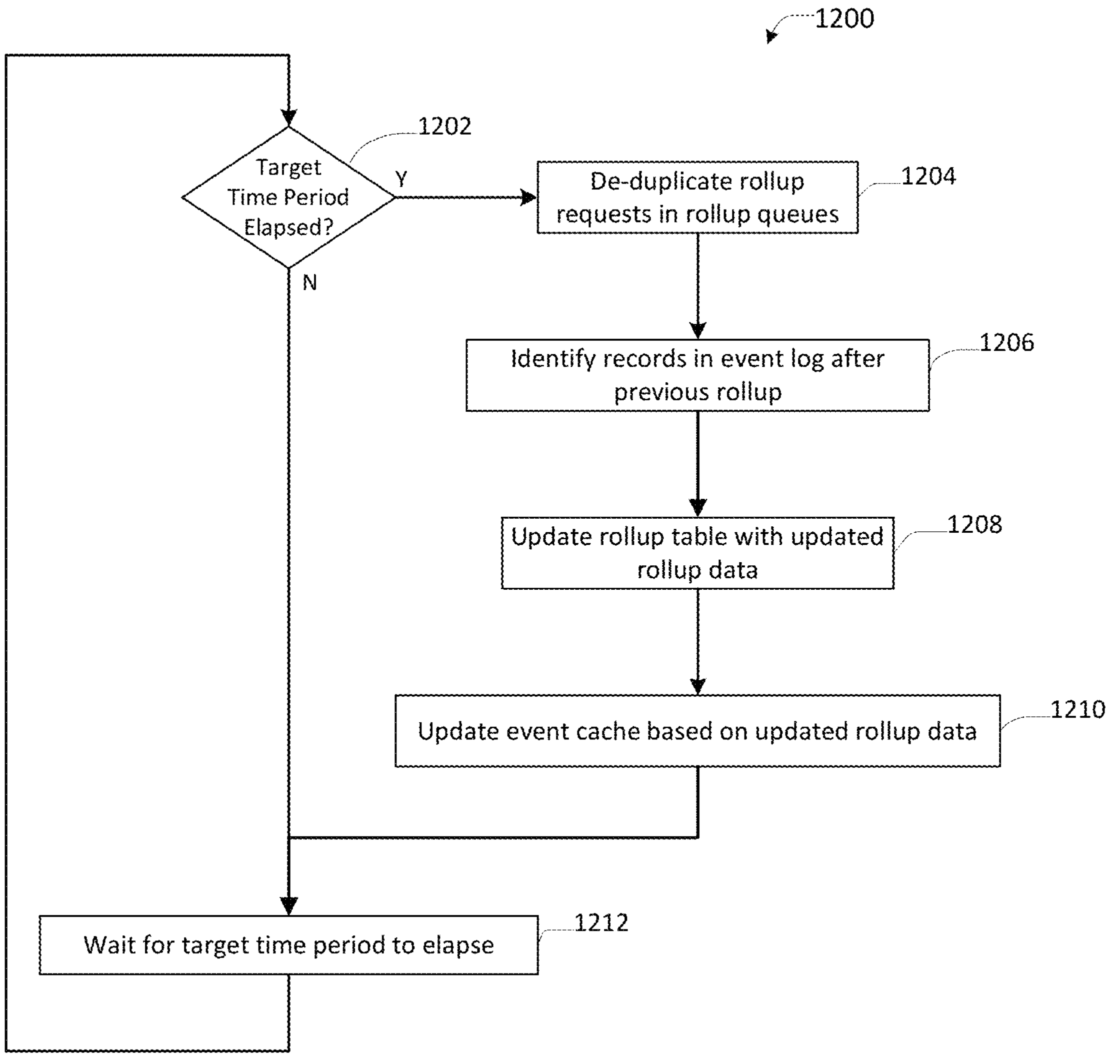
FIG. 12 sets forth a flow diagram of method steps for updating an aggregated count in the distributed computing system of FIG. 5, according to various embodiments of the present disclosure.

FIG. 12 sets forth a flow diagram of method steps for updating an aggregated count in the distributed computing system of FIG. 5, according to various embodiments of the present disclosure. Although the method steps are described with reference to the systems and call flows of FIGS. 1-10, persons skilled in the art will understand that any system configured to implement the method steps, in any order, falls within the scope of the present disclosure.

Method 1200 begins at step 1202, where the global event counter 320 determines whether a target time period has elapsed. In various embodiments, the global event counter 320 can wait for a specific time period before performing a rollup procedure. For example, the global event counter 320 could set a target time period as a specific time after the most-recent rollup procedure. Upon determining that the threshold time period has elapsed, the global event counter 320 can proceed to step 1204; otherwise, the global event counter 320 proceeds to step 1212, where the global event counter 320 waits for the target time period to elapse.

At step 1204, the global event counter 320 deduplicates the rollup requests 820 in the respective rollup queues 530. In various embodiments, the global event counter 320 can, for each rollup queue 530, deduplicate multiple rollup requests 820. For example, the global event counter 320 could deduplicate three rollup requests 820 included in a given rollup queue 530 by triggering a rollup for a given counter key included in the most-recent rollup request 820.

In some embodiments, the control server 120 can include separate rollup queues 530 for each user, for each endpoint device 115 and/or for each counter key. In such instances, the global event counter 320 filters the rollup queues 530 a subset of rollup queues 530 that include new rollup requests 820 and deduplicate the rollup requests 820 included in the subset of rollup queues 530.

At step 1206, the global event counter 320 identifies records in the event log 512 after the previous rollup. In some embodiments, the global event counter 320 can query the event log 512 for the set of time-series event records 604 that were added to the event log 512 since the previous rollup. At step 1208, the global event counter 320 updates the rollup table 514 with the updated rollup data 910. In various embodiments, the global event counter 320 aggregates count values from performing separate rollups corresponding to the counter keys included in the respective rollup requests 820 and generates a count value update by combining the count values of the separate rollups. The global event counter 320 generates the updated rollup data 910, which includes the count value update and a rollup timestamp value corresponding to when the global event counter 320 generated the count value update. The global event counter 320 transmits the updated rollup data 910 to the rollup table 514, where the global event counter 320 adds the updated rollup data 910 as an entry in the rollup table 514 to indicate that the global event counter 320 has performed a rollup of count actions 820 at a specific time.

At step 1210, the global event counter 320 updates the event cache 324 based on the updated rollup data. In various embodiments, the global event counter 320 can transmit the updated rollup data 910 to the event cache 324. In such instances, the global event counter 320 can modify the rollup data 522 stored in the event cache 324 based on the updated rollup data 910. In such instances, the global event counter 320 can retrieve the aggregated count value from the event cache 324 and can transmit the aggregated count value to requesting devices. Upon updating the rollup data 522 included in the event cache 324, the global event counter 320 proceeds to step 1212 to wait for the next target time period to elapse.

In sum, a global event counter included in a distributed computing system manages the real-time counting and aggregation of events received from multiple endpoint devices. When adding an event provided by an endpoint, the global event counter generates a time-series event that identifies the count value and the user that provided the event. The global event counter appends the time-series event into an immutable event log that maintains entries for each time-series event made by users of the distributed computing system. The global event counter also adds a rollup request to a rollup queue. In various embodiments, the global event counter updates an aggregated count by performing rollup procedures based on the rollup requests remaining in the rollup queues. The global event counter determines a new rollup count that reflects the aggregated count of the multiple users. The global event counter then updates a cache containing the current aggregated count and updates an immutable rollup table.

In some embodiments, the global event counter can receive requests for a specific submission by the user or the aggregated count. The global event counter can respond to the request for the submission of the user by retrieving the corresponding time-series event from the event log. The global event counter can retrieve the aggregated count by retrieving the aggregated count from the cache, or by triggering an immediate rollup and, upon adding a new entry to the immutable rollup table, retrieve the latest rollup count. The global event counter then transmits a response to the requesting user, where the response includes the aggregated count and/or the submission of the user.

At least one technological advantage of the disclosed techniques relative to the prior art is that the global event counter enables a device in a distributed computing system to maintain an accurate count of events received from multiple devices from multiple regions in the distributed computing system. In particular, by maintaining an immutable log of events from multiple devices, the global event counter enables a distributed computing system to quickly maintain various types counts and also avoid overcounting or undercounting of events that are being counted. In addition, by periodically processing rollup queues of counting values, the global event counter can converge to an accurate count value within a short time period, enabling the distributed computing system to provide an accurate count value instead of providing only approximate counts. Further, by separately managing write events and rollup queues, the global event counter enables the distributed computing system to process multiple events and counting values separately and independently, thus enabling the distributed computing system to compute events quickly. These technical advantages provide one or more technological advancements over prior art approaches.

1. In various embodiments, a computer-implemented method comprises receiving, from a first endpoint device, a first event during a first time period, modifying an event log to include a record associated with the first event, causing a rollup queue to include a request to count a first count value associated with the first event, and generating, in a second time period subsequent to the first time period, a counter value associated with at least the first event based on the rollup queue and the event log.

2. The computer-implemented method of clause 1, where the event log includes a set of immutable events, a first partition of the event log is not appended after a threshold time period, and generating the counter value includes aggregating a set of count values in the first partition after the threshold time period.

3. The computer-implemented method of clause 1 or 2, where each record included in the event log includes a globally-unique idempotency token that includes (i) a unique identifier, and (ii) a timestamp.

4. The computer-implemented method of any of clauses 1-3, further comprising determining that the threshold time period has elapsed, deduplicating, based on a set of idempotency tokens, a set of records included in a first partition of the event log to generate a deduplicated set of records, wherein the set of records includes the record, and generating an updated count value based on the deduplicated set of records, wherein the updated count value is included in the counter value.

5. The computer-implemented method of any of clauses 1-4, further comprising receiving, from the first endpoint device, a second message that includes the first event, appending a second record associated with the first event to the event log, wherein the first record and the second record include a globally-unique token, and deduplicating the record and the second record based on the globally-unique token.

6. The computer-implemented method of any of clauses 1-5, further comprising receiving, from the first endpoint device, a request message, determining that the request message includes a request for the first event, retrieving, from the event log, the record, and transmitting, to the first endpoint device, a response that includes the first count value retrieved from the record.

7. The computer-implemented method of any of clauses 1-6, further comprising receiving, from the first endpoint device, a request message, determining that the request message includes a request for the counter value, retrieving the counter value, and transmitting, to the first endpoint device, a response that includes the counter value.

8. The computer-implemented method of any of clauses 1-7, where the counter value is stored in at least one of (i) an event cache, or (ii) a rollup table.

9. The computer-implemented method of any of clauses 1-8, where retrieving the counter value overlaps with writing the record to the event log.

10. The computer-implemented method of any of clauses 1-9, where the first count value comprises one of (i) a negative value, or (ii) a value of 2 or higher.

11. In various embodiments, one or more non-transitory computer-readable storage media store instructions that, when executed by one or more processors, cause the one or more processors to perform the steps of, receiving, from a first endpoint device, a first event during a first time period, modifying an event log to include a record associated with the first event, causing a rollup queue to include a request to count a first count value associated with the first event, and generating, in a second time period subsequent to the first time period, a counter value associated with at least the first event based on the rollup queue and the event log.

12. The one or more non-transitory computer-readable storage media of clause 11, further storing instructions that, when executed by the one or more processors, cause the one or more processors to perform the steps of determining that a threshold time period has elapsed, upon determining that the threshold time period has elapsed, deduplicating a set of records included in a first partition of the event log to generate a deduplicated set of records, where the deduplicated set of records includes the record, each record included in the event log includes an idempotency token that includes (i) a unique identifier, and (ii) a timestamp, and the deduplicating is based on a set of idempotency tokens, and generating an updated count value based on the deduplicated set of records, wherein the updated count vale is included in the counter value.

13. The one or more non-transitory computer-readable storage media of clause 11 or 12, further storing instructions that, when executed by the one or more processors, cause the one or more processors to perform the steps of determining that the request to count a first count value associated with the first event is included in the rollup queue, aggregating, based on the request included in the rollup queue, a set of records included in the event log to generate a count value update, wherein the set of records includes the first count value, and updating the counter value based on the count value update, wherein the counter value is stored in an event cache.

14. The one or more non-transitory computer-readable storage media of any of clauses 11-13, further storing instructions that, when executed by the one or more processors, cause the one or more processors to perform the steps of generating a rollup count entry that includes the count value update and a rollup timestamp, and updating a rollup table to include the rollup count entry and the rollup timestamp.

15. The one or more non-transitory computer-readable storage media of any of clauses 11-14, where the first count value comprises one of (i) a negative value, or (ii) a value of 2 or higher.

16. The one or more non-transitory computer-readable storage media of any of clauses 11-15, further comprising instructions that cause the one or more processors to further perform the steps of receiving, by an Internet exchange (IX) point in a first region from a set of endpoint devices, a set of events made by a plurality of users, wherein the set of events includes the first event, appending a set of records associated with the set of events to a local event log, and replicating the set of events included in the local event log by appending the set of events to the event log.

17. In various embodiments, a system comprises a memory storing a global event counter application, and a processor coupled to the memory that executes the global event counter application by performing the steps of receiving, from a first endpoint device, a first event during a first time period, modifying an event log to include a record associated with the first event, causing a rollup queue to include a request to count a first count value associated with the first event, and generating, in a second time period subsequent to the first time period, a counter value associated with at least the first event based on the rollup queue and the event log.

18. The system of clause 17, where the processor further executes the global event counter application to perform the steps of determining that a threshold time period has elapsed; upon determining that the threshold time period has elapsed, deduplicating a set of records included in a first partition of the event log to generate a deduplicated set of records, where the deduplicated set of records includes the record, each record included in the event log includes an idempotency token that includes (i) a unique identifier, and (ii) a timestamp, and the deduplicating is based on a set of idempotency tokens, and generating an updated count value based on the deduplicated set of records, wherein the updated count vale is included in the counter value.

19. The system of clause 17 or 18, where the processor further executes the global event counter application to perform the steps of determining that the request to count a first count value associated with the first event is included in the rollup queue, aggregating, based on the request included in the rollup queue, a set of records included in the event log to generate a count value update, wherein the set of records includes the first count value, and updating the counter value based on the count value update, wherein the counter value is stored in an event cache.

20. The system of any of clauses 17-19, where the processor further executes the global event counter application to perform the steps of receiving, from the first endpoint device, a request message, determining that the request message includes a request for the counter value, retrieving the counter value, and transmitting, to the first endpoint device, a response that includes the counter value.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments can be embodied as a system, method, or computer program product. Accordingly, aspects of the present disclosure can take the form of an entirely hardware embodiment, an entirely software embodiment (including firmware, resident software, microcode, etc.) or an embodiment combining software and hardware aspects that can all generally be referred to herein as a "module," a "system," or a "computer." In addition, any hardware and/or software technique, process, function, component, engine, module, or system described in the present disclosure can be implemented as a circuit or set of circuits. Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors can be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure can be devised without departing from the basic scope thereof, and the scope thereof is determined by the claims that follow.

What is claimed is:

1. A computer-implemented method, comprising:
- receiving a first event;
- modifying an event log to include a record associated with the first event;
- adding, based on the first event, a request to a queue; and
- generating a counter value associated with at least the first event based on the queue and the event log.

2. The computer-implemented method of claim 1, wherein:
- the event log includes a set of immutable events;
- a first partition of the event log is not appended after a threshold time period; and
- generating the counter value includes aggregating a set of count values in the first partition after the threshold time period.

3. The computer-implemented method of claim 2, wherein each record included in the event log includes a globally-unique idempotency token that includes (i) a unique identifier, and (ii) a timestamp.

4. The computer-implemented method of claim 2, further comprising:
- determining that the threshold time period has elapsed;
- deduplicating, based on a set of idempotency tokens, a set of records included in a first partition of the event log to generate a deduplicated set of records, wherein the set of records includes the record; and
- generating an updated count value based on the deduplicated set of records, wherein the updated count value is included in the counter value.

5. The computer-implemented method of claim 1, further comprising:
- receiving a second message that includes the first event;
- appending a second record associated with the first event to the event log, wherein the record and the second record include a globally-unique token; and
- deduplicating the record and the second record based on the globally-unique token.

6. The computer-implemented method of claim 1, further comprising:
- receiving a request message;
- determining that the request message includes a request for the first event;
- retrieving, from the event log, the record; and
- transmitting, to an endpoint device associated with the request message, a response that includes a first count value included in the queue and retrieved from the record.

7. The computer-implemented method of claim 1, further comprising:
- receiving a request message;
- determining that the request message includes a request for the counter value;
- retrieving the counter value; and
- transmitting, to an endpoint device associated with the request message, a response that includes the counter value.

8. The computer-implemented method of claim 7, wherein the counter value is stored in at least one of (i) an event cache, or (ii) a rollup table.

9. The computer-implemented method of claim 7, wherein retrieving the counter value overlaps with writing the record to the event log.

10. The computer-implemented method of claim 1, wherein a first count value included in the queue comprises one of (i) a negative value, or (ii) a value of 2 or higher.

11. One or more non-transitory computer-readable storage media storing instructions that, when executed by one or more processors, cause the one or more processors to perform the steps of:

receiving, from a first endpoint device, a first event during a first time period;

modifying an event log to include a record associated with the first event;

causing a rollup queue to include a request to count a first count value associated with the first event;

generating, in a second time period subsequent to the first time period, a counter value associated with at least the first event based on the rollup queue and the event log;

determining that a threshold time period has elapsed;

upon determining that the threshold time period has elapsed, deduplicating a set of records included in a first partition of the event log to generate a deduplicated set of records, wherein:

the deduplicated set of records includes the record, and the deduplicating is based on a set of idempotency tokens; and generating an updated count value based on the deduplicated set of records, wherein the updated count vale is included in the counter value.

12. The one or more non-transitory computer-readable storage media of claim 11, wherein each record included in the event log includes an idempotency token that includes (i) a unique identifier, and (ii) a timestamp.

13. The one or more non-transitory computer-readable storage media of claim 11, further storing instructions that, when executed by the one or more processors, cause the one or more processors to perform the steps of:

determining that the request to count a first count value associated with the first event is included in the rollup queue;

aggregating, based on the request included in the rollup queue, a set of records included in the event log to generate a count value update, wherein the set of records includes the first count value; and updating the counter value based on the count value update, wherein the counter value is stored in an event cache.

14. The one or more non-transitory computer-readable storage media of claim 13, further storing instructions that, when executed by the one or more processors, cause the one or more processors to perform the steps of:

generating a rollup count entry that includes the count value update and a rollup timestamp; and updating a rollup table to include the rollup count entry and the rollup timestamp.

15. The one or more non-transitory computer-readable storage media of claim 11, wherein the first count value comprises one of (i) a negative value, or (ii) a value of 2 or higher.

16. The one or more non-transitory computer-readable storage media of claim 11, further comprising instructions that cause the one or more processors to further perform the steps of:

receiving, by an Internet exchange (IX) point in a first region from a set of endpoint devices, a set of events made by a plurality of users, wherein the set of events includes the first event;

appending a set of records associated with the set of events to a local event log; and replicating the set of events included in the local event log by appending the set of events to the event log.

17. A system comprising:

a memory storing a global event counter application; and a processor coupled to the memory that executes the global event counter application by performing the steps of:

receiving, from a first endpoint device, a first event during a first time period;

modifying an event log to include a record associated with the first event;

causing a rollup queue to include a request to count a first count value associated with the first event;

generating, in a second time period subsequent to the first time period, a counter value associated with at least the first event based on the rollup queue and the event log;

determining that the request to count a first count value associated with the first event is included in the rollup queue;

aggregating, based on the request included in the rollup queue, a set of records included in the event log to generate a count value update, wherein the set of records includes the first count value; and updating the counter value based on the count value update, wherein the counter value is stored in an event cache.

18. The system of claim 17, wherein the processor further executes the global event counter application to perform the steps of:

determining that a threshold time period has elapsed;

upon determining that the threshold time period has elapsed, deduplicating a set of records included in a first partition of the event log to generate a deduplicated set of records, wherein:

the deduplicated set of records includes the record, each record included in the event log includes an idempotency token that includes (i) a unique identifier, and (ii) a timestamp, and the deduplicating is based on a set of idempotency tokens; and generating an updated count value based on the deduplicated set of records, wherein the updated count vale is included in the counter value.

19. The system of claim 17, wherein each record included in the event log includes an idempotency token that includes (i) a unique identifier, and (ii) a timestamp.

20. The system of claim 17, wherein the processor further executes the global event counter application to perform the steps of:

receiving, from the first endpoint device, a request message;

determining that the request message includes a request for the counter value;

retrieving the counter value; and transmitting, to the first endpoint device, a response that includes the counter value.

* * * * *